US006634944B2

(12) United States Patent
Osawa

(10) Patent No.: US 6,634,944 B2
(45) Date of Patent: Oct. 21, 2003

(54) AUDIENCE TERMINAL GAME MACHINE FOR PLAYING A SELF-CONTAINED GAME IN A FIRST MODE OR, IN A SECOND MODE WAGERING ON A GAME CONDUCTED BY A REMOTE GAME MACHINE

(75) Inventor: Akira Osawa, Tokyo (JP)

(73) Assignee: Aruze Corporation (JP)

( * ) Notice: Subject to any disclaimer, the term of this patent is extended or adjusted under 35 U.S.C. 154(b) by 0 days.

(21) Appl. No.: 09/960,304

(22) Filed: Sep. 24, 2001

(65) Prior Publication Data

US 2002/0065125 A1 May 30, 2002

Related U.S. Application Data

(62) Division of application No. 09/658,267, filed on Sep. 8, 2000.

(30) Foreign Application Priority Data

Sep. 24, 1999 (JP) .......................................... 11-270601

(51) Int. Cl.[7] ................................................ A63F 13/00
(52) U.S. Cl. ........................................... 463/25; 463/42
(58) Field of Search ........................ 463/1, 6–7, 16–20, 463/22, 23, 25–29, 40–43

(56) References Cited

U.S. PATENT DOCUMENTS 5,672,106 A * 9/1997 Orford et al. ................. 463/28
5,749,785 A * 5/1998 Rossides ...................... 463/25
6,152,822 A * 11/2000 Herbert ....................... 463/22
6,315,668 B1 * 11/2001 Metke et al. ................. 463/42

FOREIGN PATENT DOCUMENTS

JP 8-206360 8/1996
JP 10-235016 9/1998
JP 10-244071 9/1998

* cited by examiner

*Primary Examiner*—Kim Nguyen
(74) *Attorney, Agent, or Firm*—Lorusso, Loud & Kelly

(57) ABSTRACT

A game machine provides play of a game wherein a hit is made or lost and including: character storage for storing information about a character which is provided separately from the game; and character raising for growing the character, which has been stored in the character storage, when the result of the game is a predetermined hit. The raised character is able to be utilized for playing another game. Thus, it is possible to increase a player's opportunity to play the other game and to increase the player's interest.

11 Claims, 14 Drawing Sheets

| | Parameter Value | Parameter Value | Parameter Value | Parameter Value |
|---|---|---|---|---|
| Swimming | 10 | 1 | 0 | 5 |
| Short-Distance Race | 6 | 8 | 0 | 5 |
| Fashion Show | 1 | 2 | 7 | 1 |
| Long-Distance Race | 4 | 4 | 0 | 5 |

AUDIENCE TERMINAL GAME MACHINE FOR PLAYING A SELF-CONTAINED GAME IN A FIRST MODE OR, IN A SECOND MODE WAGERING ON A GAME CONDUCTED BY A REMOTE GAME MACHINE

CROSS-REFERENCE TO RELATED APPLICATIONS

This application is a division of U.S. Ser. No. 09/658,267 filed Sep. 8, 2000, pending, and claims, under 35 USC 119, priority of Japanese Application No. 270601 filed Sep. 24, 1999.

BACKGROUND OF THE INVENTION

1. Field of the Invention

The present invention relates generally to a game machine, a recording medium for a game machine, and a game system. More specifically, the invention is intended to increase an opportunity to play a game with a game machine, such as a slot machine or a poker game machine.

2. Description of the Prior Art

For example, in game machines for business use, it is naturally desired that a game be enjoyed longer. However, a player who is playing a game with the same game machine for a long time sometimes gets tired of the game. In addition, if the number of wins with a game machine, which is being played by a player who is wedded to the issue of a game, is small, the player soon leaves the game machine. Therefore, in recent game machines, various devices for increasing an opportunity to play a game have been incorporated.

For example, in some slot machines, in a li-zhi state wherein a hit may be made in accordance with a design determined by the stop position of the last reel to remain rotating, the rotating speed of the remaining reel is varied in a manner which is different from a usual pattern, until the reel is stopped, so that the expectation of a hit is increased to retain the player's interest. In addition, in some slot machines, when a predetermined hit is made, the machine automatically plays roulette as a bonus game to pay coins in accordance with the position of a stopped ball to increase the reward for a win and to thereby enhance interest to the player.

In game machines installed in casinos, the players concern is often the outcome of the game. Such a player wants to more quickly ascertain the issue of the game, rather than enjoy the change in operation of li-zhi, so that change in exhibiting the game does not always contribute to an increase of the opportunity to play the game for such a player.

In addition, even in the case of a game machine providing a bonus game, although a reward per game is slightly increased, the player leaves his/her seat after having spent a predetermined amount of money, so that the bonus game only slightly contributes to an increased opportunity to play the game.

SUMMARY OF THE INVENTION

It is therefore desired to provide a game machine having a new function of increasing a player's opportunity to play a game, so that it is an object of the present invention to provide such a game machine.

It is another object of the present invention to provide a recording medium which can be used in such a game machine, and a game system including such a game machine and recording medium as components.

In order to accomplish the aforementioned and other objects, according to one aspect of the present invention, there is provided a game machine for executing a program for play of a game wherein a hit is made or lost as the result of the game, the game machine comprising: character storing means for storing information about a character which is provided separately from the game; and character raising means for growing the character stored in the character storing means, when the result of the game is a predetermined hit.

The game machine may further comprise: recording medium access means for detachably holding a portable recording medium for a game machine, and for accessing the held recording medium for the game machine; and character information storage control means for causing information about a character, which has been stored in the recording medium for the game machine, to be read out by the recording medium access means and to be stored in the character storing means, and for causing the character, which has been stored in the character storing means, to be recorded in the recording medium for the game machine by the recording medium access means.

The game machine may further comprise: communication means for communicating with another game machine; and character participating means for transmitting information about the character, which has been stored in the character storing means, to the other game machine via the communication means to cause the character, which has been stored in the character storing means, to participate in a game which is carried out by the other game machine and in which the character serves as a player.

The game machine may further comprise: participation fee receiving means for receiving a participation fee for causing the character to participate in the game which is carried out by the other game machine and in which the character serves as a player; and prize paying means for receiving a payout from the game, which is transmitted from the other game machine, via the communication means when the participating character receives a prize.

The game system includes a first game machine for carrying out a game in which a character is a player; and a second game machine comprising the above described game machine for providing the first game machine with the character which participates in the game carried out by the first game machine.

According to another aspect of the present invention, there is provided a portable recording medium for use in a game machine in which the recording medium is detachably held and which comprises: character storing means for storing information about a character which is provided separately from an executed game; character raising means for growing the character, which has been stored in the character storing means, when the result of the game is a predetermined hit; recording medium access means; and character information storage control means, wherein by control of the character information storage control means, information about the character, which has been stored in the recording medium for the game machine, is read out via the recording medium access means and stored in the character storing means, and information about the character, which has been stored in the character storing means, is recorded via the recording medium access means.

The game system of the invention may include a first game machine for carrying out a game in which a character is a player; and a character participating terminal unit for reading the character, which participates in the game carried out by the first game machine, out of a recording medium for the above described game machine, and to provide the first game machine with the read character.

According to a further aspect of the present invention, there is provided a game machine including: communication means for communicating with another game machine; game-result expected information input means for inputting information as to expectation of the result of a game which is carried out by the other game machine; bet receiving means for receiving a bet on the expected result; information transmitting means for causing the other game machine to transmit the inputted expectation information and information about the bet via the communication means; and dividend paying means for receiving the information about the result of the game, which has been transmitted by the other game machine, via the communication means, and paying a dividend when the information of the result of the game coincidences with the expectation bet upon.

In another embodiment the game system includes: a first game machine for carrying out a predetermined game; and a fourth game machine comprising the above described game machine for inputting to a third game machine information as to the expected result of the game played by the third game machine.

BRIEF DESCRIPTION OF THE DRAWINGS

The present invention will be understood more fully from the detailed description given herein below and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENTS

(A) First Preferred Embodiment

Referring now to the accompanying drawings, the first preferred embodiment of a game machine, a recording medium for the game machine and a game system according to the present invention will be described in detail below.

(A-1) Construction of the Game System in the First Preferred Embodiment

Figure 1:
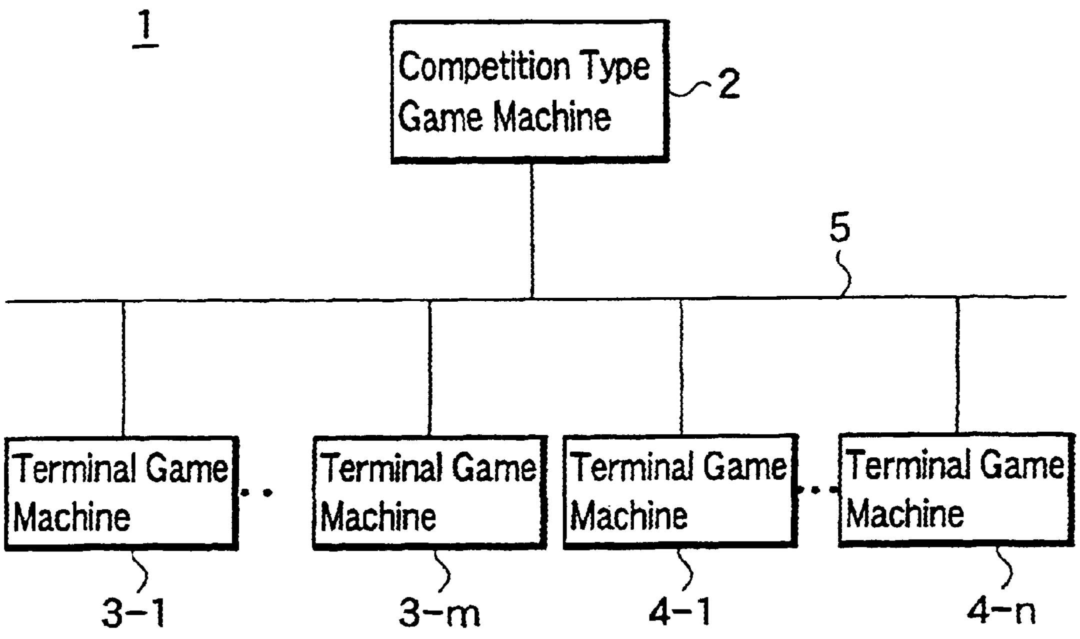
FIG. 1 is a block diagram showing the whole construction of the first preferred embodiment of a game system according to the present invention.

The first preferred embodiment of a game system according to the present invention is shown in FIG. 1 as a game system 1 including a competition type game machine 2, and a plurality of terminal game machines 3-1 through 3-m and 4-1 through 4-n, which are connected to each other via a wire or radio network 5. Furthermore, if the network 5 is a wire network, its connection type may be any one of bus, mesh and ring types. In addition, a repeating installation and a route switching installation may be suitably provided in the network 5. Moreover, the An plurality of terminal game machines 3-1 through 3=and 4-1 through 4-n may be connected directly to the competition type game machine 2 in the form of a star.

For example, the competition game machine 2 is designed to play a game in which a plurality of characters participate to compete with each other. The competition type game is a game in which the rankings of characters participating in the game are determined. For example, the competition type game is not only a game in which characters for a short-distance race or a horse race simultaneously compete with each other, but it may be also a game in which characters successively play a weightlifting match. In this first preferred embodiment, the competition type game machine 2 is designed to play a plurality of different competition type games.

Each of the terminal game machines 3-1 through 3-m and 4-1 through 4-n has both the function of a unit game machine and the function of a terminal unit of the game system 1 which is a network system.

The terminal game machines 3-1 through 3-m and 4-1 through 4-n are divided into two kinds of terminal game machines by the function as a terminal unit.

The first kind of terminal game machines (which will be hereinafter referred to as character participating terminal game machines) 3-1 through 3-m are designed to allow a character to participate in a competition type game, which is carried out by the competition type game machine, on the basis of a payment of a participation fee for the opportunity to win a prize in accordance with the results of competition. The second kind of terminal game machines (which will be hereinafter referred to as audience terminal game machines) 4-1 through 4-n are designed to allow a person, who bets on his/her expectation of the results of competition, to participate as an audience member in the competition type game which is carried out by the competition type game machine 2, a to obtain a dividend when the bet on the expectation is right.

Furthermore, the character participating terminal game machines 3-1 through 3-m may play different kinds of games when functioning as a unit game machine. For example, the character participating terminal game machine 3-1 may play a slot machine game when functioning as a unit game machine, whereas the character participating terminal game machine 3-2 may play a poker game when functioning as a unit game machine.

In addition, the same game machine may serve as either the character participating terminal game machine 3 or the audience terminal game machine 4 according to circumstances. That is, FIG. 1 divides the game system 1 of the first preferred embodiment only for simplicity of explanation.

(A-1-1) Schematic Internal Construction of the Competition Type Game Machine

Figure 2:
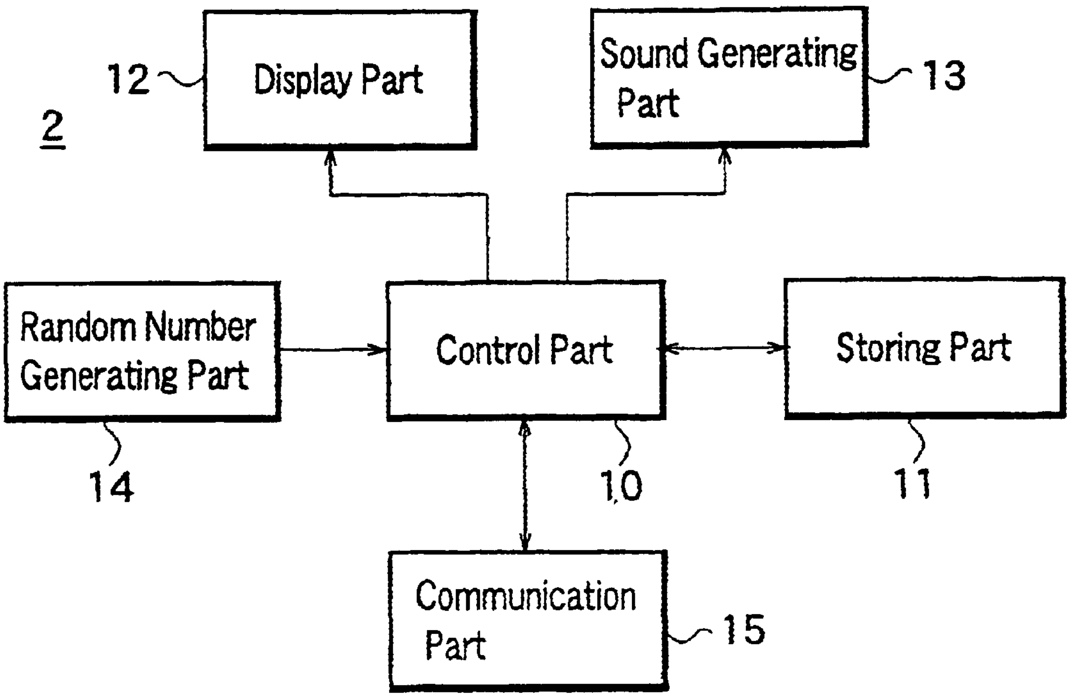
FIG. 2 is a functional block diagram showing the construction of a competition type game machine in the first preferred embodiment.

As shown in FIG. 2, the competition type game machine 2 generally comprises a control part 10, a storage part 11, a display part 12, a sound generating part 13, a random number generating part 14 and a communication part 15.

The display part 12 comprises a display and a driving circuit for the display. The display part 12 is designed to display a competition screen for a competition type game on a large display surface which is visible to the naked eye from a very wide range in a place of amusement in which the game system 1 is provided. Such a display having a large display 10 area may be a projection type projector or a display unit having a plurality of CRT tube faces which are arranged in the form of a matrix.

The sound generating part 13 is designed to produce and output sound and voice in accordance with the progress of a competition type game, under the control of the control part 10. The sound generating part 13 comprises a speaker, a speaker driving circuit, and a voice synthesizing circuit (including a voice decoding circuit and so forth).

The random number generating circuit 14 is designed 20 to generate a random number and to provide the random number to the control part 10 when the control part 10 makes a demand for a random number.

The communication part 15 is designed to communicate with the character participating terminal game machines 3-1 through 3-m and the audience terminal game machines 4-1 through 4-n. Furthermore, digital communication is preferred, regardless of the communication methods. In addition, although the communication part 15 may adopt the polling method, it is preferably provided with a plurality of input/output ports so as to be able to simultaneously communicate with a plurality of terminal game machines.

The storage part 11 is designed to store a program for executing a competition type game by the control part 10, and fixed data. In the storage part 11, the working area required to execute the program is suitably set. The storage part 11 comprises a storage part body, such as a ROM or RAM, and a drive circuit for driving the storage part body.

The control part 10 is designed to execute a competition type game while controlling the respective parts of the competition type game machine 2 in accordance with the program and fixed data, which have been stored in the storage part 11, by suitably utilizing the working area on the storage part 11. The control function of the control part 10 will be clarified by the description of operation which follows later.

(A-1-2) Schematic Internal Construction of the Character Participating Terminal Game Machine 3

Figure 3:
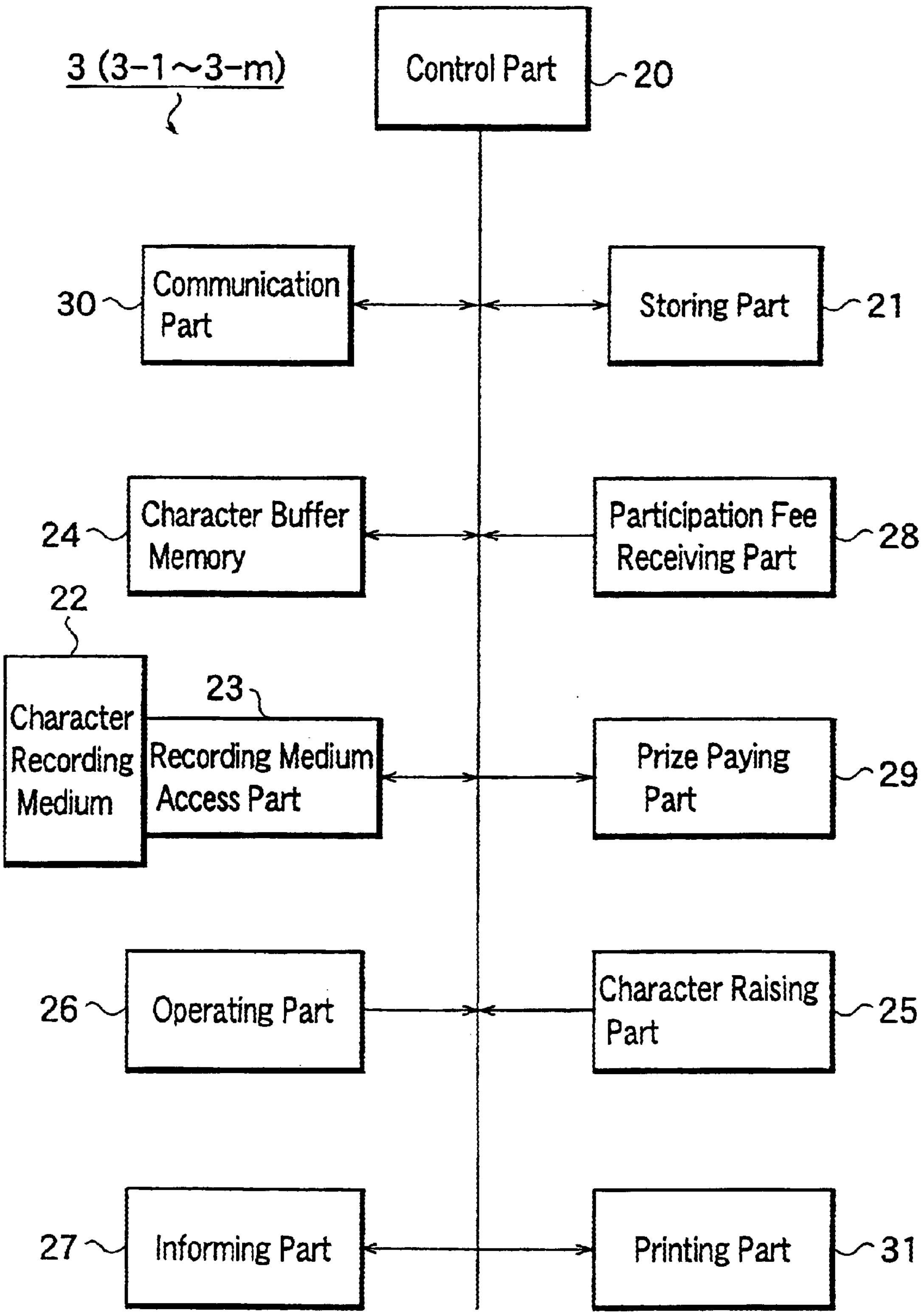
FIG. 3 is a functional block diagram showing the construction of a character participating terminal game machine in the first preferred embodiment.

FIG. 3 is a functional block diagram showing the internal construction of the character participating terminal game machine 3 (3-1 through 3-m) which is arranged to function as a terminal unit of the game system 1. That is, the construction for a game independently executed by the character participating terminal game machine 3 itself is omitted from FIG. 3.

In FIG. 3, each of the character participating terminal game machines 3 comprises, functioning as a terminal unit of a game system, a control part 20, a storage part 21, a character recording medium 22, a recording medium access part 23, a character buffer memory 24, a character raising part 25, an operating part 26, a display part 27, a participation rate receiving part 28, a prize paying part 29 and a communication part 30.

The character recording medium 22 is a recordable/reproducible medium of a size capable of being easily carried by a player, such as an IC card or a magnetic card. The character recording medium 22 stores one or a plurality of items of information on characters capable of participating in a competition type game which is carried out by the competition type game machine 2. The character recording medium 22 is suitably loaded on and ejected from the recording medium access part 23 by the game player.

Furthermore, in the first preferred embodiment, the character recording medium 22 is intended to be common to the plurality of different kinds of games of character participating terminal game machines 3-1 through 3-m. The character recording medium 22 is issued from, e.g., a recording medium issuing unit in a place of amusement, with or without payment. The character recording medium 22 has been already initialized and formatted in a recording area when it is issued.

The recording medium access section 23 is designed to read out character information, which has been recorded in the character recording medium 22, and to record character information in the character recording medium 22, under the control of the control section 20.

The character buffer memory 24 is designed to store 5 character information in the character participating terminal game machine 3. The character information read out of the character recording medium 22 is stored in the character buffer memory 24. The character information stored in the character buffer memory 24 is recorded in the character recording medium 22 under the control of the control section 20, if necessary.

The character buffer memory 24 also constitutes a storage medium. The block diagram of FIG. 3 also shows the character buffer memory 24, in addition to the storage section 21 which will be described later, in order to clarify the place of storage of character information which is used for communication or raised.

The character raising section 25 is designed to raise a character. As can be clearly seen from the description of operation which follows below, in the above described competition type game carried out by the competition type game machine 2, the probability that a participating character will win a prize increases and decreases in accordance with the degree to which that character has been raised. The raising of a character means that the number of clothes and things which are worn and possessed by the character is increased (the number of items is increased) or that the character is grown if it is an animal.

As described above, FIG. 3 shows the internal construction of the character participating terminal game machine 3 which is arranged as a terminal unit of the game system and which functions as a unit game machine as described above. As can be clearly seen from the description of a slot machine, as an example of the character participating terminal game machine 3 which will be described later, the character is raised in accordance with the results of a game which is played at the character participating terminal game machine, i.e., in accordance with a predetermined hit. In FIG. 3, the section related to such a raising of a character is shown as the character raising part 25.

The operating part 26 is designed to accept a player's operation inputs, such as an operation input for allowing a character to participate in the above-described competition type game carried out by the competition type game machine 2, an operation input for reading a character stored in the character recording medium 22, and an operation input for recording a character, which has been stored in the character buffer 24, in the character recording medium 22.

The output section ("informing part") 27 includes a display and a sound generator. The informing part 27 is designed to inform a player of various items of information under the control of the control part 20, such as information about the display of an input screen using the operating part 26, information about the display of the current processing stage and/or audio output of the information, and information output of the result of the competition type game, in which the character has participated, by display and/or sound.

The participation fee receiving part 28 is designed to receive a participation fee, which is required to allow a character to participate in the competition type game carried out by the competition type game machine 2, under the control of the control part 20. The participation fee may be independent of the degree of the raising of the character, or may vary in accordance with the degree of the raising of the character, or may be optionally determined by the player. With the character participating terminal game machine 3 functioning as a unit game machine, a game carried out by a unit game machine can be executed upon input of coin or paper money. A device for inputting and receiving the coin or paper money may be also used as the participation fee receiving part 28. If play is free, it is not required to provide the participation fee receiving part 28.

The prize paying part 29 is designed to pay a prize under the control of the control part 29 when the character, which has participated in the competition type game carried out by the competition type game machine 2, wins a prize. The prize may be a fixed prize determined in accordance with the ranking of arrival, or may vary in accordance with the number of participating characters and/or the total of bets. When the character participating terminal game machine 3 functions as a unit game machine, coin or paper money corresponding to a hit are paid when the hit is made in the game. Such a device for paying the coin or paper money is also used as the prize paying part 29.

The communication part 30 is designed to communicate with the competition type game machine 2 under the control of the control part 20.

A printer 31 is designed to graphically print 10 and output character information, which has been stored in the character buffer memory 24, under the control of the control part 20.

The storage part 21 is designed to store a processing program, which is executed by the control part 20, as a terminal unit of the game system, and fixed data. In the storage part 21, the working area required to execute the program is suitably set. The storage part 21 also comprises a storage medium, such as a ROM or RAM, and a drive circuit for driving the storage medium. As described above, FIG. 3 shows the character buffer memory 24 in addition to the storage part 21.

The control part 20 is designed to execute the processing as the terminal unit while controlling the respective functional parts as the terminal unit, which allows the characters of the game system to participate in the game, in accordance with the program and fixed data, which have been stored in the storage part 21, by suitably utilizing the working area on the storage part 21. The control function of the control part 20 will be clarified by the description of operation which follows.

(A-1-3) Schematic Internal Construction of the Audience Terminal Game Machine 4

Figure 4:
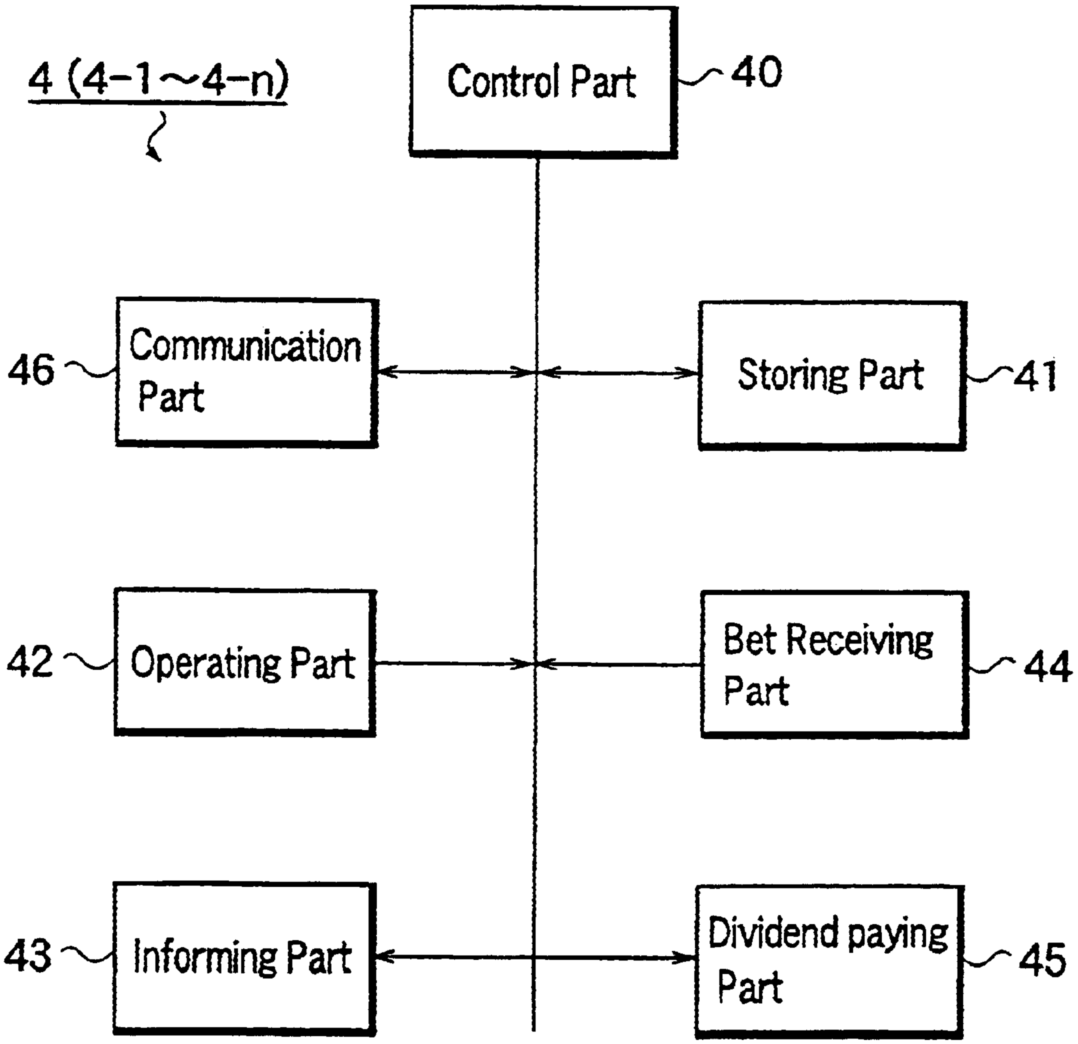
FIG. 4 is a functional block diagram showing the construction of an audience terminal game machine in the first preferred embodiment.

FIG. 4 is a block diagram of the internal construction of an audience terminal game machine 4 (4-1 through 4-n) which is arranged as a terminal unit of the game system. That is, arrangement for independent execution of a game by the audience terminal game machine 4 itself is omitted from FIG. 4.

In FIG. 4, each of the audience terminal game machines 4 comprises, as a terminal unit of the game system 1, a control part 40, a storage part 41, an operating part 42, a display part 43, a bet receiving part 44, a dividend paying part 45 and a communication part 46.

The operating part 42 is designed to accept a player's input, such as an input for participating in the above described competition type game, which is carried out by the competition type game machine 2, as an audience participant who has placed a bet on the result of competition which he or she expects.

The informing part 43 includes a display and a sound generating device. The informing part 43 is designed to communicate various items of information under the control of the control part 40, such as information about the operation input screen using the operating part 42, information about the current processing stage by display and/or audio output, information regarding the result of the competition type game, for which the bet has placed and in which the player has participated as audience, by display and/or audio output.

The bet receiving part 44 is designed to receive a bet 5 for the competition type game, which is carried out by the competition type game machine 2, under the control of the control part 40. The bet may be optionally determined by the player. With the audience terminal game machine 4 functioning as a unit game machine, a game carried out by a unit game machine can be executed, provided coins or paper money is input. A device for inputting and receiving the coins or the paper money may be also used as the bet receiving part 44.

The dividend paying part 45 is designed to pay a dividend under the control of the control part 40 when the result of the competition type game carried out by the competition type game machine 2 is coincident with the result bet upon. The dividend naturally varies in accordance with so-called odds and the amount of the bet. With the game machine 4 functioning as a unit game machine, coin or paper money corresponding to a hit are paid when the hit is made in the game played at the unit game machine. The device for paying the coin or paper money is also used as the dividend paying part 45.

The communication part 46 is designed to communicate with the competition type game machine 2 under the control of the control part 40.

The storage part 41 is designed to store a processing program, which is executed by the control part 40, as a terminal unit of the game system, and fixed data. In the storage part 41, the working area required to execute the program is suitably set. The storage part 41 also comprises a storage medium, such as a ROM or RAM, and a drive circuit for driving the storage medium.

The control part 40 is designed to execute the processing as the terminal unit while controlling the respective functions of the terminal unit which participates in the game as audience in the game system, in accordance with the program and fixed data which have been stored in the storage part 41, by suitably utilizing the working area on the storage part 41. The control function of the control part 40 will be clarified by the description of operation which follows.

(A-2) Operation of Game System in the First Preferred Embodiment

The operation of the game system 1 in the first preferred embodiment will be described below.

(A-2-1) Operation of Competition Type Game Machine 2

First, referring to the flow chart of FIG. 5, the operation of the competition type game machine 2 will be described in detail below.

Figure 5:
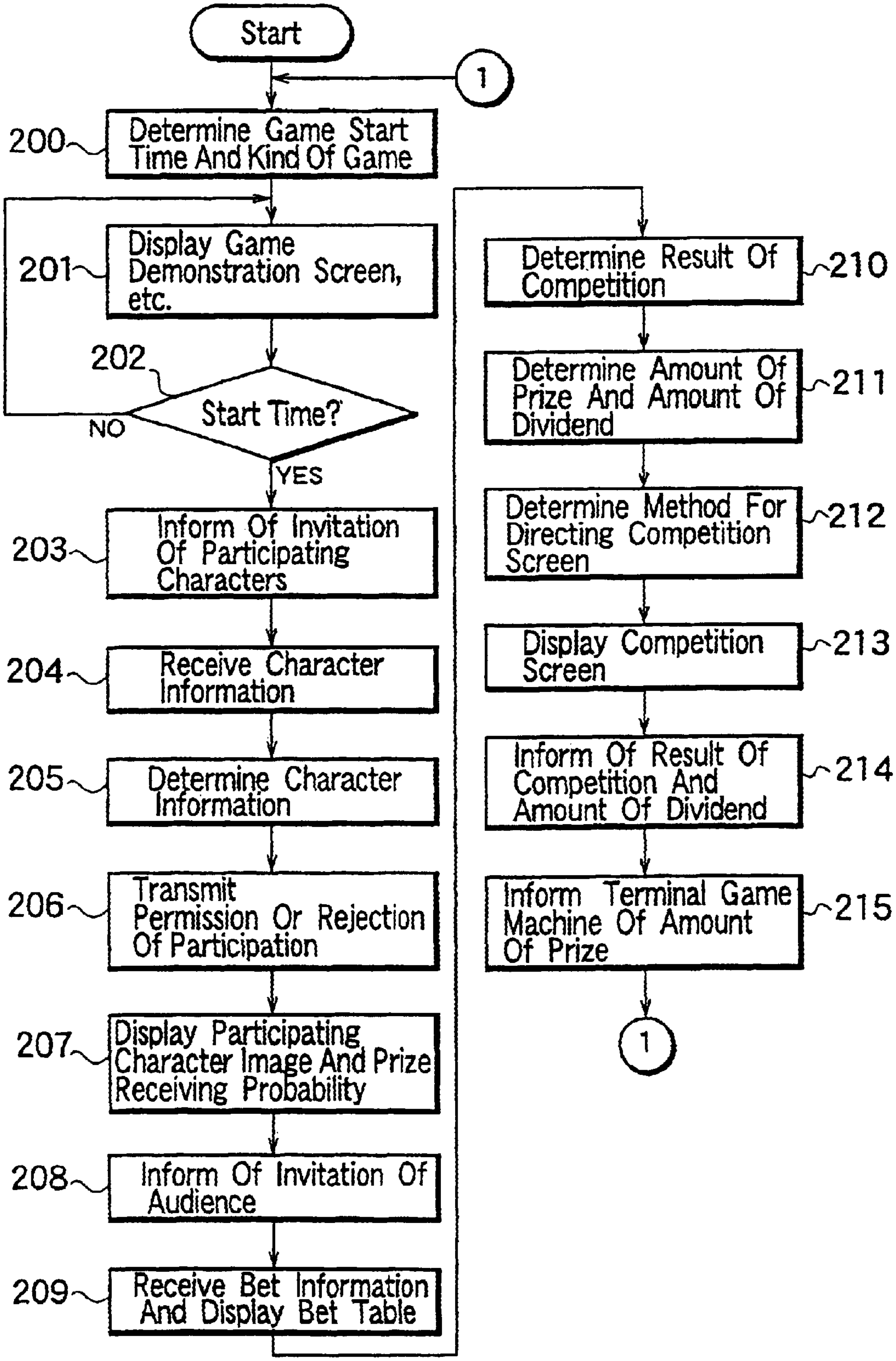
FIG. 5 is a flow chart showing the operation of the competition type game machine in the first preferred embodiment.

When the power supply of the game system 1 is turned on, the control part 10 of the competition type game machine 2 starts execution of the routine shown in FIG. 5 (programs and so forth have been stored in the storage part 11).

Then, the control part 10 determines a time, at which the competition type game is to start, and the kind of the game which is executed from that time (step 200). In addition, before a start time, the control part 10 causes the display part 12 to display a screen (also serving as a screen for clarifying a start time), such as a demonstration screen for the determined competition type game, and causes the sound generator 13 to produce and output a demonstration voice or the like, while monitoring time utilizing a built-in timer (steps 201, 202).

Figure 6:
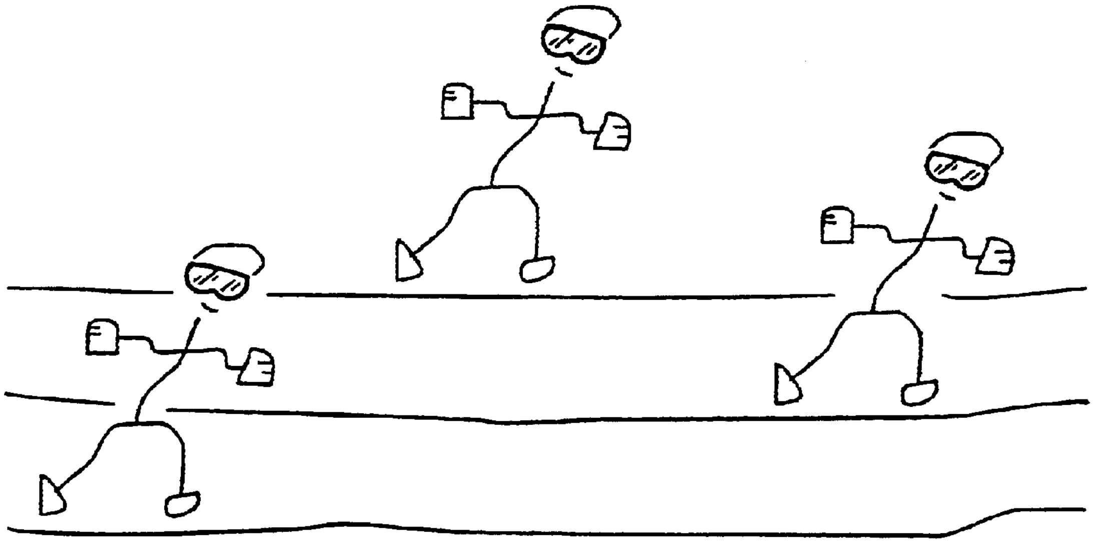
FIG. 6 is an illustration showing a demonstration screen serving to explain both a competition type game and an example of a character in the first preferred embodiment.

FIG. 6 shows an example of a demonstration screen. In FIG. 6, the number of participating characters is 3. Of course, the number of participating characters should not be limited thereto. In this example, the determined competition type game is a short-distance race. In the example of FIG. 6, the characters on the demonstration screen are not raised. The total of parameter values of items, such as clothes, which are added to the characters in the skeleton state, indicates the raised state (value) of the characters. Furthermore, if parameters are not determined for each of the items, the parameter value of the character is, e.g., the number of items.

At the starting time for the competition type game, the control part 10 of the competition type game machine 2 invites characters to participate in the game, by means of the display 12 and the sound generator 13 (step 203). In accordance therewith, the control part 10 receives participating character information, which is transmitted from the plurality of character participating terminal game machines (3-1 through 3-m), via the communication part 15 (step 204). Then, the control part 10 determines which characters are allowed to actually participate in the competition type game, from the received plurality of items of character information (step 205), and returns permission or refusal for each of the characters to participate in the game, to each of the character participating terminal game machines, which have transmitted the character information, via the communication section 15 (step 206).

The characters allowed to actually participate in the competition type game may be determined by, e.g., continuing to receive character information until reaching, the number of characters required to play the competition type game, and thereafter, the arriving characters may be rejected. In addition, for example, the arrival of character information may be accepted until a predetermined time after the invitation of characters, and if the number of characters intended to participate in the competition type game exceeds the number required to play the game, the number of participating characters may be adjusted. For example, if the participation fee is variable, the participating characters may be determined in order of the amount of the participation fee, and if the participation fee is fixed, the participating characters may be automatically selected on the basis of random numbers generated from the random number generating part 14, or selected in accordance with the degree to which each of the characters has been raised. Furthermore, there is a possibility that the character information from different character participating terminal game machines is the same. In this case, the participating characters may be alternatively selected, or all of the characters may be permitted to participate in the game.

After the characters participating in the competition type game are thus determined, the control part 10 causes the display part 12 to display participating character images, and determines prize receiving probabilities in accordance with the total parameter values of the respective participating characters, which are determined in accordance with the type of the current competition type game, to cause the display part 12 to display the determined prize receiving probabilities (step 207). Then, the control part 10 invites audience participants to place bets and thereby participate in the game (step 208), by means of the display 12 and the sound generator 13. In accordance therewith, the control part 10 receives bet information (including estimated information on prize receiving characters), which is transmitted from some of the plurality of audience terminal game machines (4-1 through 4-n), via the communication part 15, and produces a display of a dividend table (so-called odds) which is serially updated in accordance with the received bet information (step 209).

The prize receiving probabilities, which have been determined at step 200, in the competition type game which will now be started, is determined, e.g., as follows.

Figure 7:
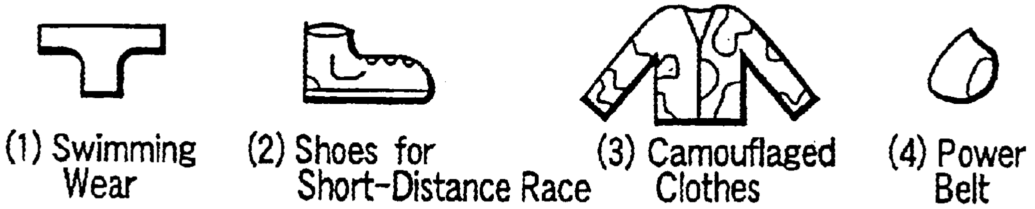
FIG. 7 is an illustration of an example of items which are mounted on the character in the first preferred embodiment.

It is herein assumed that the raising of the characters is carried out by adding items. For example, items such as clothes are mounted on the skeleton characters shown in FIG. 6. FIG. 7 shows examples of such items which include "swimming wear", "shoes for short-distance race, "camouflaged clothes" and a "power belt". To each of the items, different parameter values are assigned in accordance with the type of the competition game. For example, as shown in FIG. 7, if the competition type game is "swimming", a parameter value of "10" is assigned to the swimming wear, and if the competition type game is a "short-distance race , a parameter value of "6" is assigned to the swimming wear. On the other hand, if the competition type game is a "fashion show", a parameter value of "1" is assigned to the swimming wear, and if the competition type game is a "long-distance race", a parameter value of "4" is assigned to the swimming wear.

With respect to the type of the competition game which has been determined at step 200 and which will now be started, each of the participating characters has a total parameter value which is the total of the parameter values assigned to its respective items. For example, when the competition type game to be started is the "short-distance race", the total parameter value of a participating character having the "swimming wear" and the "shoes for short-distance race" is "14".

For simplicity of explanation, it is assumed that only the first winner receives a prize and that the ratios of the total parameter values of the respective participating characters are prize receiving probabilities. For example, if the number of the participating characters is 3 and if the total parameter values of the respective participating characters are "10", "6" and "4", the prize receiving probabilities are "0.5", "0.3" and "0.2", respectively.

The payout is determined as a percentage, based on the bets of all of the audience participants (odds), and so forth, of an amount of money which is obtained by subtracting a predetermined amount, such as an amount to be received by a manager of the place of amusement (and amounts paid to the audience participants as prizes), from the total of the bets.

The invitation to the audience participants to place a bet and to thereby participate in the game is continued, e.g., until closing time. The receipt of a bet after the deadline of the invitation is rejected, and the refusal is returned to the transmitting terminal, although these operations are omitted from FIG. 5.

After the invitation is completed, the control part 10 causes the random number generating part 14 to generate random numbers, and also utilizes the generated random numbers to determine the ranking of each of the participating characters in the competition type game (step 210). For example, if the number of the participating characters is 3 and if the first prize receiving probabilities of the respective participating characters are "0.5", "0.3", and "0.2", respectively, three-digit random numbers "500" through "999" are set so as to correspond to a first participating character, three-digit random numbers "200" through "499" are set so as to correspond to a second participating character, and three-digit random numbers "000" through "199" set so as to correspond to a third participating character. In addition, the first prize is determined by the first generated random number, and the second and subsequent prizes are determined by subsequently generated random numbers.

After the rankings in the results of competition are determined, the control part 10 determines the amounts of the prizes which are to be paid to the character participating terminal game machines for the prize receiving characters, and the amounts of the dividends which are to be paid to the audience terminal game machines, the estimated rankings of which are coincident with the determined rankings (step 211), and determines how to direct a competition screen for the competition type game, to be subsequently displayed, in accordance with the determined rankings (step 212). As a pattern for directing the competition screen, a method for determining a directing method in the existing horse race type game may be applied. For example, one pattern may be selected from a number of previously prepared directing method patterns (this selection also utilizes random numbers).

Then, the control part 10 causes the display part 12 to display a competition screen for the competition type game on the basis of the determined directing pattern, and suitably causes the sound generating part 13 to produce an appropriate audio (step 213).

After the display of the competition screen for the competition type game is completed, the control part 10 causes the display part 12 to display a screen showing the results of competition and dividends (step 214). In addition, the control part 10 informs the character participating terminal game machine for the participating character which has received the first prize, of the amount of the prize, and informs the audience terminal machines, the estimated rankings of which are coincident with the competition rankings, of the dividend amounts, via the communication part 15 (step 215).

Thereafter, the routine returns to step 200. Thus, a new starting time and the type of new game are determined. Furthermore, the execution of the next game may be started without delay. In addition, the type of the next game may be determined in accordance with a cyclic order in which the types of a plurality of games capable of being executed are varied, or may be determined by utilizing random numbers. Furthermore, the number of the types of the games capable of being executed by the competition type game machine 2 may be one.

(A-2-2) Operation of Character Participating Terminal Game Machine 3

Referring to the flow chart of FIG. 8, the operation of the character participating terminal game machine 3 as the terminal unit of the game system 1 will be described in detail below.

Figure 8:
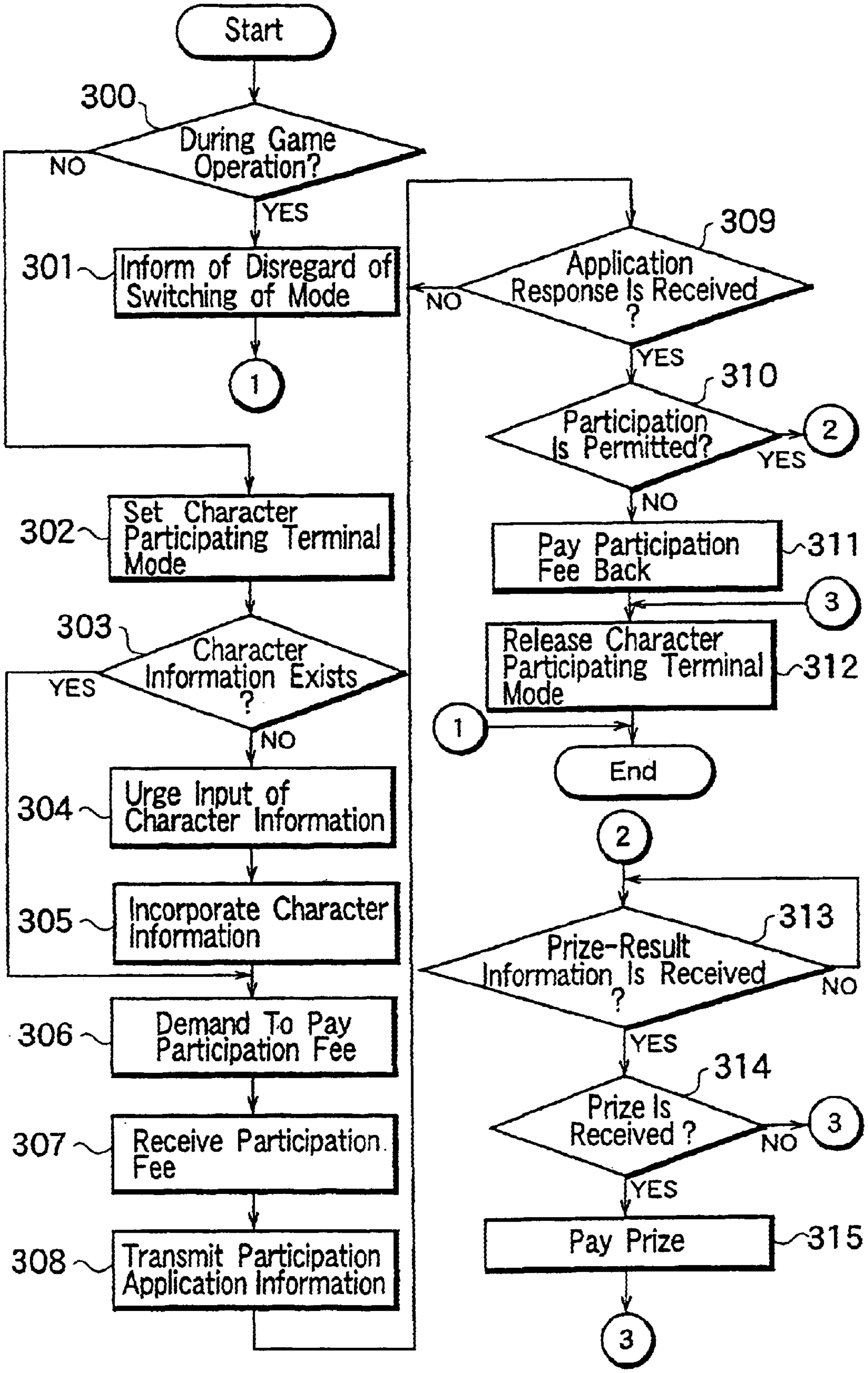
FIG. 8 is a flow chart showing the operation of the character participating terminal game machine in the first preferred embodiment.

When the control part 20 of the character participating terminal game machine 3 receives a character participating terminal mode signal, which indicates that the game machine 3 is to operate as a terminal unit for causing the characters of the game system 1 to participate in the game, from the control part 20, the control part 20 starts execution of the routine of FIG. 8 (programs and so forth have been stored in the storage part 21) as an interruption.

When the display part 12 and sound generating part 13 of the competition type game machine 2 invite the characters to participate in the game (see the above described step 203), if the player for the game machine 3 intends to cause a character to participate in the game, the player uses operating part 26 to cause the game machine 3 to operate as a terminal unit for participation of the character in the game.

If the control part 20 receives the character participating terminal mode signal, the control part 20 determines whether the game machine 3 is playing a game as a unit game machine, i.e., whether the game machine 3 has been in a stand-by state for a game operation (step 300). For example, if the basic game carried out by the game machine 3 is a slot machine game, a game operating time is a period of time until the reels have stopped after the input of coins or the like, or a period of time until coins are paid when the combination of the stopped reels is a hit.

If the character participating terminal mode signal is output to the control part 20 during the operation of the game, the control part 20 disregards this mode signal, and informs the player of this signal rejection by means of the informing part 27 to immediately end the routine shown in FIG. 8.

On the other hand, if the character participating terminal mode signal is output to the control part in the stand-by state for the operation of the game, the control part 20 sets the game machine 3 in a character participating terminal mode (for example, it sets a mode flag in the storage part 21 (step 302)). Thereafter, the control part 20 determines whether character information has been stored in the character buffer memory 24 (step 303).

If no character information has been stored in the character buffer memory 24, the control part 20 causes the informing part 27 to urge input of character information which has been stored in the character recording medium 22 (step 304). In accordance therewith, the player operates the operating part 26 and so forth to store character information, which has been read out of the character recording medium 22 via the recording medium access part 23, in the character buffer memory 24 (step 305).

Furthermore, if no character information has been stored in the character buffer memory 24, the character participating terminal mode may be released to end the routine shown in FIG. 8. In addition; when the character information is read out of the character recording medium 22, if a plurality of items of character information have been stored in the character recording medium 22, selection of the character information may be allowed.

If character information has been originally stored in the character buffer memory 24 or if character information is stored therein by the current read operation, the control part 20 causes the informing part 27 to urge payment of a participation fee (step 306). In accordance therewith, the participation fee receiving part 28 receives the participation fee which has been paid by the player (step 307).

Furthermore, at step 306, the control part 20 also causes the informing part 27 to inform the player of the participation fee. If the amount of the participation fee is fixed, the informing part 27 informs the player of the amount of the participation fee. If the amount of the participation fee is determined by the type of the competition game and the parameter values of the characters, after the control part 20 communicates the type of competition game to the competition game machine 2 which will now be executed, it determines the amount of the participation fee which information is output to the informing part 27.

As described above, the participation fee receiving part 28 can also be used as a coin receiving part in the usual game for the game machine 3. For example, if the game machine 3 is designed to play a slot machine game, there is an upper limit to the number of coins per game. However, in the case of the participation fee, the participation fee receiving part (coin receiving part) 28 confirms that the operation mode is the character participating terminal mode, and receives coins, the number of which exceeds the upper limit for the slot machine game. In addition, some game machines for playing a slot machine game are designed to hold information about the number of coins, which are capable of being paid, without paying coins or the like every game, to subtract coin information, which is required to play the game, from the information. Such a functional construction may be utilized to receive the participation fee.

If a participation fee exceeding the determined amount of participation fee is paid, the control part 20 causes the prize paying part 29 to pay back the excessive amount. This refund is not only carried out by physically paying coins or the like, but it may be also carried out by adding to the stock coin information.

After the participation fee is thus received, the control part 20 transmits participation application information, including at least character information, to the competition type game machine 2 via the communication part 30 (step 308). As described above, although the participation application information may include only the character information (naturally including terminal identification information), the participation application information may also include the fact that the participation fee has been paid, and the amount of the participation fee. In addition, the transmitted character information may be only information as to the mounted items if the character is the item adding type character.

After the participation application information is transmitted, the control part 20 waits for notice of a return from the competition type game machine 2 to the control part 20, to be given from the communication part 30 (step 309). When the return is received, it is determined whether the content of the return is permission or refusal for the character to participate in the game (step 310).

If the return is refusal for the character to participate in the game, the control part 20 causes the prize paying part 29 to pay back the participation fee (step 311). Moreover, the control part 20 releases the setting of the character participating terminal mode (step 312). In other words, the control part 20 causes return to the mode in which the usual game can be executed, and ends the routine shown in FIG. 8.

On other hand, if the return is permission for the character to participate in the game, the control part 20 waits for notice that information about the result of the prize in the competition type game has been received from the communication part 30 (step 313). If such notice is given, the control part 20 determines the contents of information about the results of the prize (step 314).

If the contents of information about the results of the prize indicates that the character has failed to receive the prize, the control part 20 releases the setting of the character participating terminal mode (step 312). In other words, the control part 20 cause return to the mode in which the usual game is capable of being executed, and ends the routine shown in FIG. 8.

If the content of the information about the results of the prize indicates that the character has received the prize, the control part causes the prize paying part 29 to pay the prize (step 315), and thereafter, releases the setting of the character participating terminal mode (step 312). In other words, the control part 20 causes return to the mode in which the usual game is capable of being executed, and ends the routine shown in FIG. 8.

If it has been determined that the amount of the prize is an amount a predetermined times as large as the participation fee, it is not required that information about the results of the prize include the amount of the prize. If the amount of the prize is varied by the total of the bets, it is required that information about the results of the prize include the amount of the prize, and the prize paying part 29 pays the amount of the prize corresponding thereto.

Furthermore, if inaction on the competition screen for the competition type game is very long, the game machine 3 may be allowed to play the original game (e.g., a slot machine game) although this is different from the above description.

(A-2-3) Operation of Audience Terminal Game Machine 4

Referring to the flow chart of FIG. 9, the operation of the audience terminal game machine 4 as a terminal unit of the game system 1 will be described in detail below.

Figure 9:
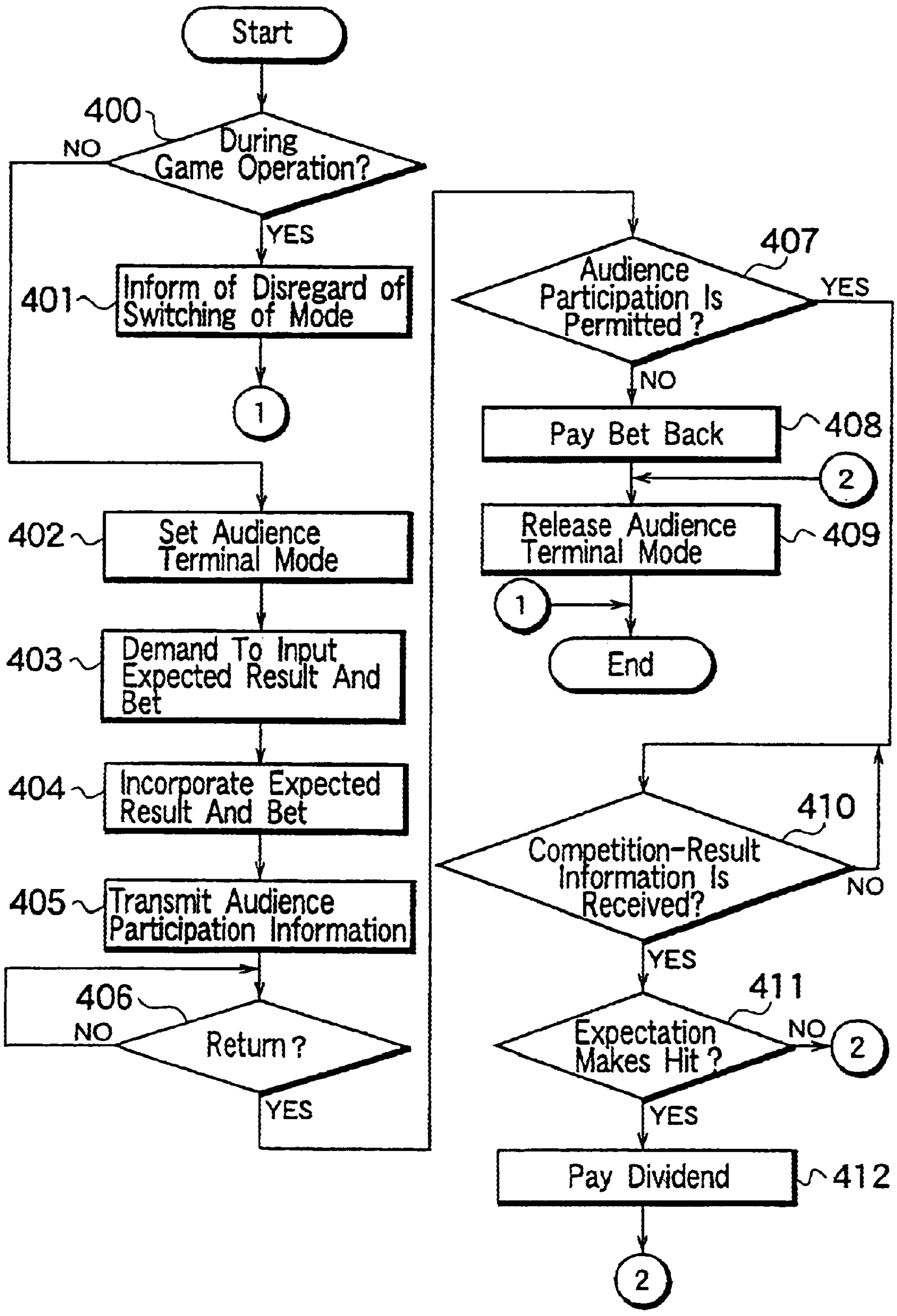
FIG. 9 is a flow chart showing the operation of the audience terminal game machine in the first preferred embodiment.

When the control part 40 of the audience terminal game machine 4 receives an audience terminal mode signal which indicates that the game machine 4 is to operate as an audience participation terminal unit of the game system 1, to allow an audience to place a bet on the results of competition using the operating part 42, the control part 40 starts execution of the program of FIG. 9.

When the display part 12 and sound generating part 13 of the competition type game machine 2 inform the player for the game machine 4 that he/she is invited (see the above described step 208) to participate in the game as an audience member, the player may operate the operating part 42 to cause the game machine 4 to operate as a terminal unit of the game system 1.

If the control part 40 receives the audience terminal mode signal, the control part 40 determines whether the game machine 4 is playing a game as a unit game machine, i.e., whether the game machine 4 has been in a stand-by state for game play (step 400). The expression "the game machine is playing a game" means the same as that in the character participating terminal game machine 3.

If the audience terminal mode signal is given to the control part 40 during the operation of the game, the control part 40 disregards this audience terminal mode signal, and informs the player of the disregard by means of the informing part 43 (step 401) to immediately end the routine shown in FIG. 9.

On the other hand, if the audience terminal mode signal is given to the control part 40 while in the stand-by state, the control part 40 sets the game machine 4 to be in the audience terminal mode (for example, it sets an audience terminal mode flag in the storage part 41 (step 402)).

Thereafter, the control part 40 causes the informing part 43 to demand input of the expected results of competition to be bet upon (step 403). In accordance therewith, the control part 40 accepts the expected results of competition which have been inputted by the player using the operating part 42, and the bet which has been paid to the bet receiving part 44 (step 404). More than one set of expected results of competition and bet may be accepted.

As described above, the bet receiving part 44 can also be used as a coin receiving part in the usual game for the game machine 4. In addition, some game machines 4 for playing a slot machine game or the like are designed to hold information about the number of coins, which are capable of being paid, without paying coins or the like upon completion of every game, subtracting coins information required to play the game, from the indicated number of coins. Such a functional construction may be utilized for receiving the bet. After the assignment (input) of the combination of the expected results of competition and the bet a part of the bet may be allocated to a certain expected result of competition, and the rest is allocated to another expected result of competition. That is, the assignment (input) of the combination of the expected results of competition and the bet may be carried out by any method.

After the assignment of the combination of the expected results of competition and the bet is thus received, the control part 40 transmits audience participation information including at least information about the combination of the expected results of competition and the bet (the audience participation information naturally includes terminal identification information), to the competition type game machine 2 via the communication part 46 (step 405).

After the audience participation information is transmitted, the control part 40 waits for notice of a return from the competition type game machine 2 to the control part 40, to be output given from the communication part 40 (step 406). When the return is received, the control part 40 determines whether the content of the return is permission or refusal for the player to participate as an audience member in the game (step 407).

If the return is refusal to allow participation in the game (e.g., if an application is made after the closing time for entry, or if the contents of the return include expected results of competition which specify a character which does not participate in the game), the control part 40 causes the dividend paying part 45 to return the bet (step 408). Moreover, the control part 40 releases the setting of the audience terminal mode (step 409). In other words, the control part 40 returns the game machine to a state in which the usual game can be executed, and ends the routine shown in FIG. 9.

On the other hand, if the return is permission for the player to participate as audience in the game, the control part 40 waits for notice that information about the results of the competition in the competition type game has been received (step 410) and, when such notice is given, the control part 40 determines the content of information about the results of the competition (step 411).

If the information about the results of the competition indicates results contrary to all of the input expected results, the control part 40 releases the setting of the audience terminal mode (step 409) to return the game machine to a state in which the usual game can be executed, and ends the routine shown in FIG. 9.

If the contents of information about the results of competition include information about dividends, the control part 40 causes the dividend paying part 45 to pay a dividend (step 412), and, thereafter, releases the setting of the audience terminal mode (step 409) to return the game machine to the state in which the usual game can be executed, ending the routine shown in FIG. 9.

(A-3) Slot Machine as Terminal Game Machine

As an example of a terminal game machine capable of serving as the character participating terminal game machine 3 or audience terminal game machine 4 of the game system 1, a slot machine having mechanical reels will be described below.

Furthermore, a mode in which the terminal game machine operates as the slot machine will be hereinafter referred to as the "usual operation mode", a mode in which the terminal game machine operates as the character participating terminal game machine 3 will be hereinafter referred to as a "character-participating terminal mode", and a mode in which the terminal game machine operates as the audience terminal game machine 4 will be hereinafter referred to as an "audience terminal mode". Although character information is required to play a competition type game in the competition type game machine 2, the raising of characters is carried out in the usual operation mode.

(A-3-1) External Appearance of the Slot Machine

Figure 10:
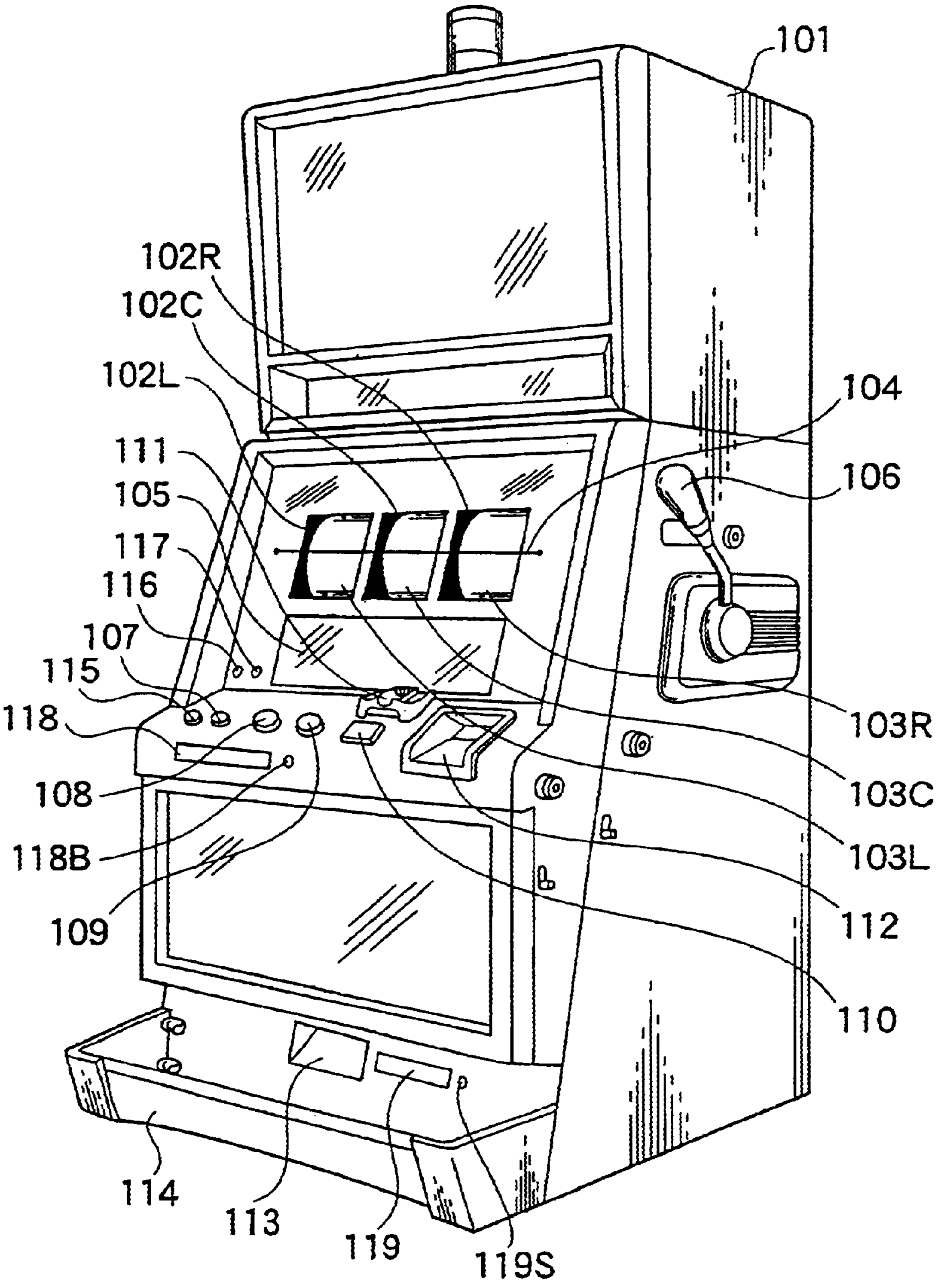
FIG. 10 is a perspective view showing the appearance of a slot machine as an example of the terminal game machine in the first preferred embodiment.

FIG. 10 is a perspective view showing the appearance of a slot machine. First, referring to FIG. 10, the external appearance of the slot machine will be described below.

On the front face of a slot machine body 101, three display windows 102L, 102C and 102R are arranged slightly above center extending laterally. Inside the slot machine body 101 facing the display windows 102L, 102C and 102R, are three rotatable reels 103L, 103C and 103R. On the outer peripheral surface of each of the reels 103L, 103C and 103R, a plurality of designs (which will be hereinafter referred to as "symbols") are circumferentially drawn so that one of the symbols is visible to the naked eye via each of the display windows 102L, 102C and 102R.

Furthermore, in the example of the slot machine 101 shown in FIG. 10, a single prize receiving line is laterally drawn so as to connect the centers of the display windows 102L, 102C and 102R. However, in a slot machine wherein a plurality of symbols are visible to the naked eye via each of the display windows 102L, 102C and 102R, a plurality of prize receiving lines are drawn in lateral and oblique directions.

Below the group of the display windows 102L, 102C and 102R on the front face of the slot machine body 101, a liquid crystal display 105 is provided.

In the usual operation mode, the liquid crystal display 105 is designed to display images of, e.g., characters and items which are mounted on the characters when a predetermined hit is made, and to display the types of hits which result in the addition of items. That is, with the liquid crystal display 105, the player can verify the present state of the character and in the next stage (due to the additional mounted items). The term "hit" means that the combination of three symbols stopping on the prize receiving line 104 is a predetermined combination.

In addition, in the character participating terminal mode and audience terminal mode, the liquid crystal display 105 is designed to display an operating instruction, a menu screen for selecting options, the results of the competition type game, dividends and so forth.

On the right side face of the slot machine body 101, is a start lever 106 for simultaneously rotating all of the reels 103L through 103R. By pulling the start lever 106 forward, all of the reels 103L through 103R start to rotate. Furthermore, the reels 103L, 103C and 103R, which have started to rotate, stop in turn, e.g., after lapse of predetermined periods of time, respectively. For example, the reels 103L, 103C and 103R stop in that order.

In addition, on the front face of the slot machine body 101, an operation panel is arranged slightly below center. On the operation panel, there are arranged general components of the slot machine, such as a C/P switch 107, a 1BET switch 108, a spin switch 109, a maximum BET switch 110, a coin slot 111 and a bill insertion port 112, as well as a game machine operation mode switch 115, a character participating terminal mode LED 116, an audience terminal mode LED 117, an IC card receiver 118 and an IC card ejecting button 118B.

The C/P switch 107 is a switch for credit and settlement. The iBET switch 108 and the maximum BET switch 110 are switches for setting a bet in each game. The spin switch 109 is a switch for rotating the reels 103L, 103C and 103R, similar to the start lever 106. The coin slot 111 and the bill insertion port 112 are used for inputting coins and paper money.

The game machine operation mode switch 115 is e.g., a push button. The game machine operation mode switch 115 is designed to cyclically vary the character participating terminal mode, the audience terminal mode and the usual operation mode every depression. Furthermore, the slot machine sometimes automatically returns the game machine from the character participating terminal mode or from the audience terminal mode to the usual operation mode (see FIGS. 8 and 9).

The character participating terminal mode LED 116 is turned on when the operation mode is the character participating terminal mode. Similarly, the audience terminal mode LED 117 is turned on when the operation mode is the audience terminal mode. In other words, the fact that both of the character participating terminal mode LED 116 and the audience terminal mode LED 117 are turned off indicates that the operation mode is the usual operation mode.

The IC card receiver 118 is an inlet/outlet for detachably mounting an IC card. Furthermore, in this example of a slot machine, the IC card is utilized as the character recording medium 22 (see FIG. 3). The IC card ejecting button 118B is a button for causing the ejection of the IC card loaded in the slot machine. Furthermore, the IC cart ejecting button 118B is designed to operate a non-electric ejecting structure.

The above described switches, such as the start switch 106, the iBET switch 108, the spin switch 109 and the maximum BET switch 110, are also used as operating elements for selecting options on the menu screen which is displayed on the liquid crystal display 105, in addition to the above described functions (the slot machine functions). For example, the function of a select key in a personal computer or the like may be assigned to the start lever 106, the function of moving a cursor to the left in the personal computer or the like may be assigned to the iBET switch 108, the function of moving the cursor to the right in the personal computer or the like may be assigned to the spin switch 109, and the function of moving the cursor downward in the personal computer or the like may be assigned to the maximum BET switch 110. Of course, dedicated operation keys in the character participating terminal mode and the audience terminal mode may be provided.

In the lower portion on the front face of the slot machine body 101, a paying port 113 is provided for discharging coins and/or paper money, as a payout when a hit is made, into a pan 114.

In addition, in the lower portion on the front face of the slot machine body 101, is a seal dispenser 119 for discharging a seal on which a character image has been printed by means of a printer 142 (see FIG. 11), and a print start switch 119S for starting the printing, although the seal dispenser 119 and the print start switch 119S have no direct relation to the slot machine game.

(A-3-2) Internal Structure of the Slot Machine

Figure 11:
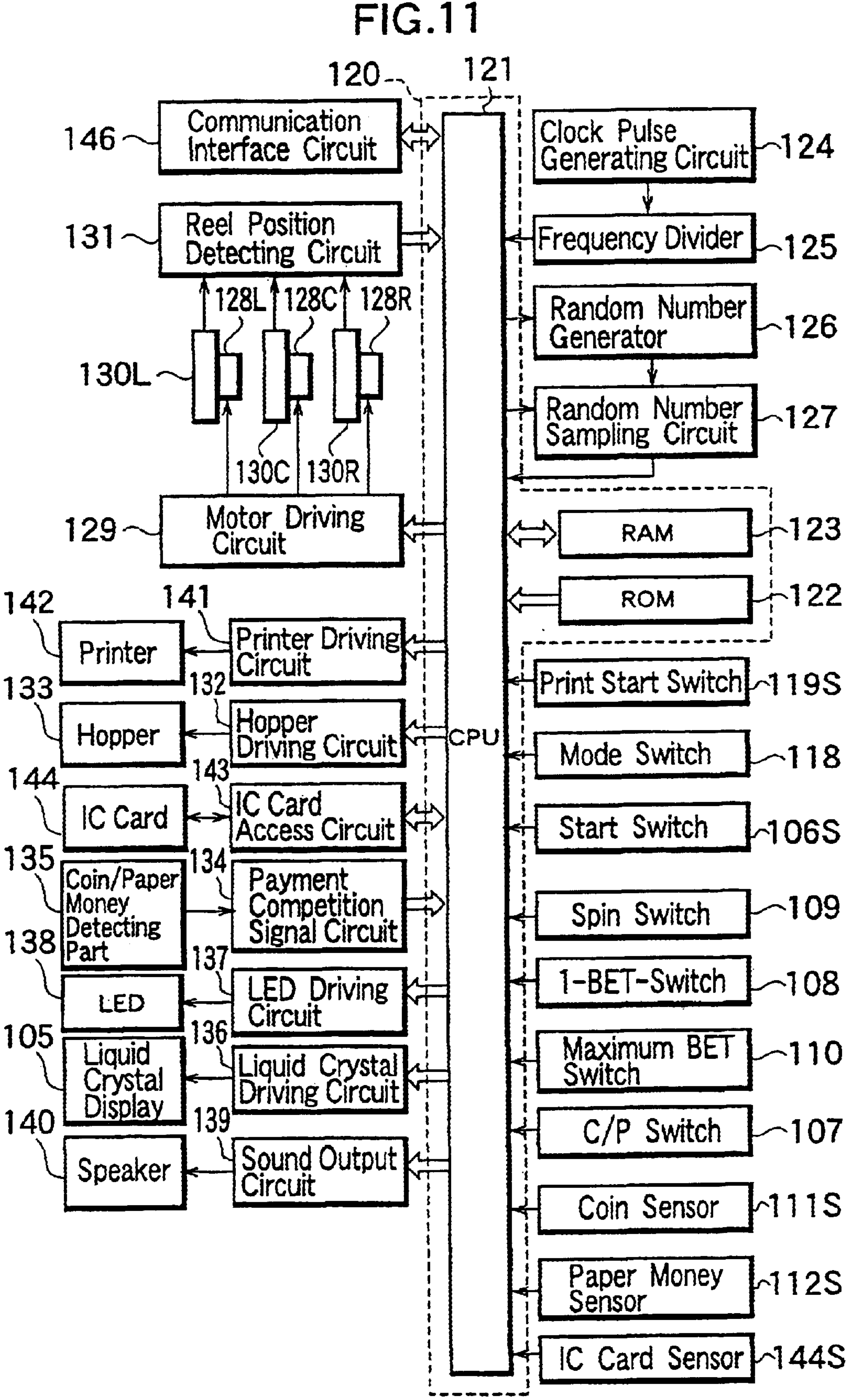
FIG. 11 is a block diagram showing the construction of a control system for use in the slot machine of FIG. 10.

FIG. 11 is a functional block diagram schematically showing the construction of a control unit for electrically controlling the slot machine. FIG. 11 shows not only the control part for controlling a game, but also peripheral units (an actuator and so forth) electrically connected to the control part.

The control unit is mainly comprised of a microcomputer 120, and further comprises circuits, such as a random number sampling circuit, which will be described later.

The microcomputer 120 comprises a CPU 121 for execution of a preset program, and a RON 122 and ROM (including an EEPROM or the like) 123 serving as memory means. An area within the RAM 123 serves as the character buffer memory 24 which has been described with reference to FIG. 3.

The CPU 121 is connected to a clock pulse generating circuit 124 for generating a reference clock pulse, a frequency divider 125 for frequency-dividing the reference clock pulse to generate an operation clock having a predetermined frequency, which may be more than one type, a random number generator 126 for generating random numbers in a predetermined range, and a random number sampling circuit 127 for extracting optional random numbers from the generated random numbers.

Main peripheral circuits and devices, which are controlled by control signals from the microcomputer 120, include stepping motors 128L, 128C and 128R for rotating the reels 103L, 103C and 103R (see FIG. 10), respectively, a hopper 133 for housing coins and paper money, the liquid crystal display 105, LEDs (the character participating terminal mode LED 116 and the audience terminal mode LED 117) 138, a speaker 140, the printer 142 and an IC card 144.

These circuits and devices are driven by a motor driving circuit 129, a hopper driving circuit 132, a liquid crystal driving circuit 136, a LED driving circuit 137, a sound output circuit 139, a printer driving circuit 141, and an IC card access circuit 143, respectively. These driving circuits 129, 132, 136, 137, 139, 141 and 143 are connected to the CPU 121 via I/O ports of the microcomputer 120. Furthermore, each of the stepping motors 128L, 128C and 128R makes one rotation when a driving signal of 400 pulses is supplied from the motor driving circuit 129.

Input signals to the microcomputer 120, are generated by a start switch 1065 for detecting the operation of the start lever 106, the C/P switch 107, the iBET switch 108, the spin switch 109, the maximum BET switch 110, a coin sensor 111S, a paper money sensor 112S, the game machine operation mode switch 115, the print start switch 119S, and an IC card sensor 144S for detecting the loading of an IC card 144.

Input signals are also generated by a reel position detecting circuit 131 for receiving output pulse signals from photo sensors 130L, 130C and 13OR, to detect the position of each of the reels 103L, 103C and 103R; and a payment completion signal circuit 134 for confirming that a payout has been completed.

When the reel position detecting circuit 131 receives a reset pulse every rotation of each of the reels 103L, 103C and 103R, that receipt is detected by the corresponding photo sensors 130L, 130C and 130R, and the reel position detecting circuit 131 informs the CPU 121 of the input of the reset pulse. The CPU 121 receives this reset pulse, the CPU 121 clears a numerical value corresponding to the rotational position in one rotation of each of the reels, which is formed in the RAM 123, to correct the shift of the moving display of each of the symbols from the rotation of a corresponding one of the stepping motors 128L, 128C and 128R each rotation.

The payment completion signal circuit 134 informs the CPU 121 of the completion of a payment when the number of coins and paper money, which are counted by a coin/paper money detecting part 135 and which are paid from the hopper 133, reaches a predetermined amount.

A communication interface circuit 146 is provided for allowing the microcomputer 120 to communicate with remote locations. In this example, radio communication is assumed. The communication interface circuit 146 houses communication lines (not shown) and is designed to transmit signals, which are to be transmitted from the microcomputer to the outside, through the communication lines, and to receive signals, which have been transmitted from the outside, and to feed the received signals to the microcomputer 120. In this manner, the microcomputer 120 communicates with the competition type game machine 2. Furthermore, if the place of amusement is provided with a control center for controlling the status of coins and paper money in each of game machines by remote supervisory control or the like, the microcomputer 120 also communicates with such a control center.

Furthermore, the slot machine may communicate with the competition type game machine 2 via the above described control center.

(A-3-3) Slot Machine Game Operation

The game operation in the usual operation mode, which is mainly carried out by the microcomputer 120, will be described below. The game operation is by execution of a program stored in the ROM 122.

While the slot machine involves the raising of a character during the game operation, the description of the operation of the raising of a character is omitted here, in first describing the slot machine general operation.

When a power supply is turned on, the microcomputer 120 is in a controllable state, and an initialization processing for initial values for use in the rotation control of the reels 103L, 103C and 103R, the region of the RAM 123 and so forth is carried out.

Thereafter, the microcomputer 120 waits for coins and paper money to be input into the coin entry 111 and the bill entry 112. The microcomputer 120 verifies the input, thereafter verifies the placing of a bet, and waits for the start lever 106 or the spin switch 109 to be operated.

When the start switch 106S detects the operation of the start lever 106 or when the spin switch is operated, the microcomputer 120 instructs the motor driving circuit 129 to simultaneously start to rotate all of the reels 103L, 103C and 103R. At this time, the microcomputer 120 receives random numbers which are generated by the random number generator 126 to be sampled by the random number sampling circuit 127, and compares the random numbers with prize-receiving determining data, which have been stored in the ROM 122, to determine the prize receiving form (including blanks) of the game.

The microcomputer 120 instructs the motor driving 10 circuit 129 to sequentially stop the reels 103L, 103C and 103R so as to form a combination of the symbols corresponding to the determined prize receiving form. If the determined prize receiving form is not a hit, the microcomputer 120 waits for a new game to start.

On the other hand, if the determined prize receiving form is a hit, the microcomputer 120 drives the hopper driving circuit 132 to pay coins or paper money. At this time, the microcomputer 120 waits for a completion signal from the payment completion signal circuit 134, and waits for a new game to start in response to the incoming of the completion signal.

Figure 12:
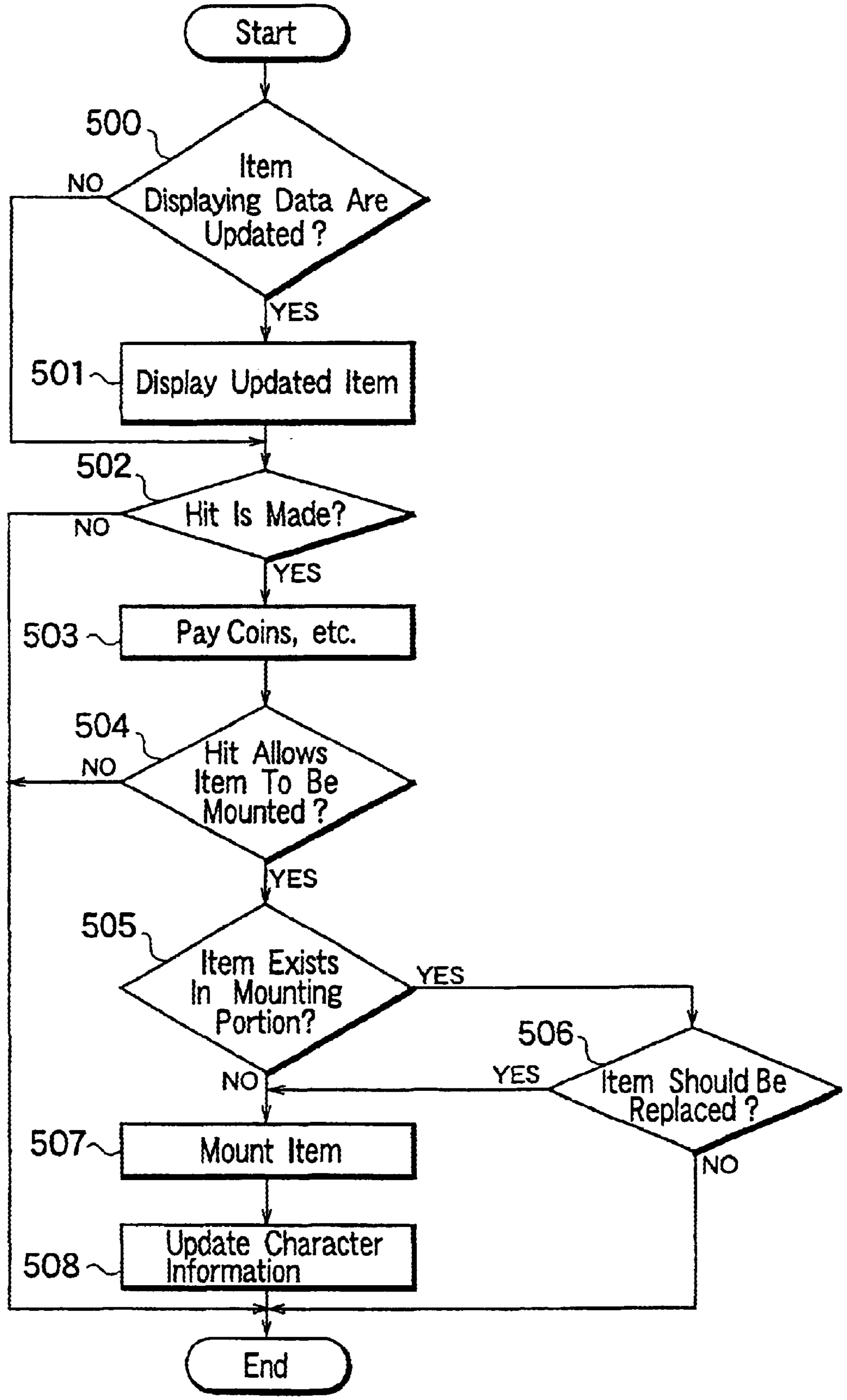
FIG. 12 is a flow chart showing a character raising routine executed in the slot machine of FIG. 10.

Referring to FIG. 12, the operation related to the raising of a character, which is incorporated into the above-described general operation, will be described below. FIG. 12 mainly shows the operation of the raising of the character, and it should be noted that some steps of the above described general operation are omitted from FIG. 12.

If a new game processing starts, the microcomputer 120 determines whether item displaying data have been updated (step 500). The updating of the item displaying data is executed by the processing of FIG. 15 which will be described later.

If the item displaying data have been updated, the microcomputer 120 causes item images, which have been displayed on the liquid crystal display 105 and which are intended to be additionally mounted on the character, to change to item images related to the updated item displaying data (step 501).

Figure 13A:
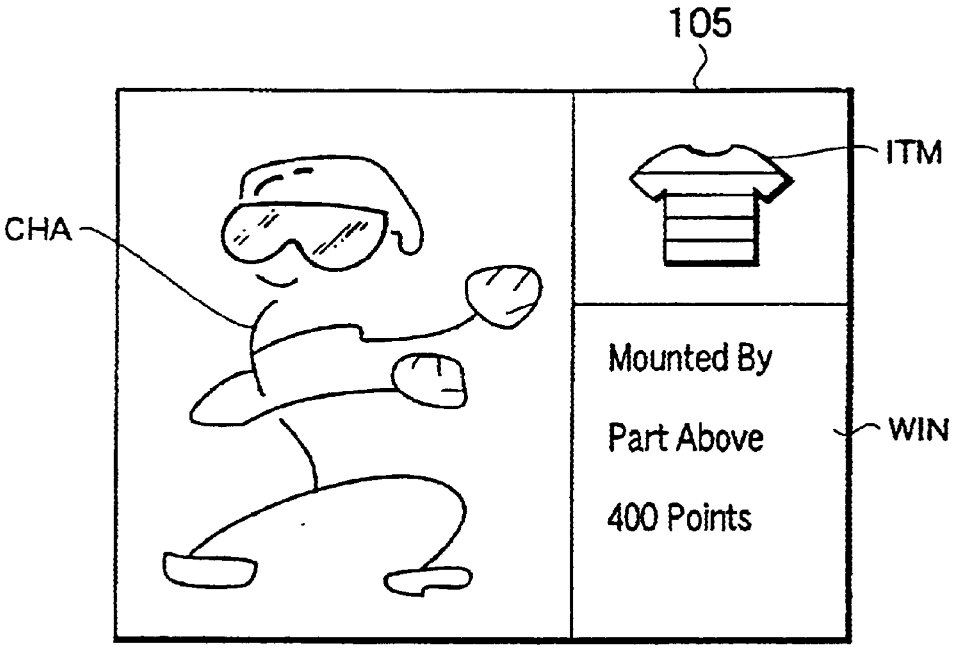
FIGS. 13(A) and 13(B) are illustrations showing display screens for displaying items which are intended to be added to a character in the slot machine of FIG. 10.

FIG. 13(A) is an illustration showing the contents displayed on the liquid crystal display 105. On the liquid crystal display 105, there are displayed an image CHA of a character at that time (FIG. 13(A) shows the state where no item is mounted on the character), an image ITM of an item which is intended to be mounted on the character, and information WIN identifying the kind of hit (part), by which the item can be mounted. When the displayed item is updated, the image ITM of the item and the information WIN, are updated.

Furthermore, if the character image CHA does not move, the display is too rigid, so that there is the possibility that the player will lose interest. Therefore, as shown in FIGS. 14(A) through 14(F), the character image CHA is preferably animated.

When the microcomputer 120 causes the reels 103L, 103C and 103R to rotate and to be sequentially stopped, the microcomputer 120 determines what hit has been made (step 502). Then, if no hit has been made, the microcomputer 120 ends the current game.

If a hit has been made, the microcomputer 120 pays coins or paper money according to the prize receiving form (step 503).

Thereafter, the microcomputer 120 determines whether the hit prize receiving form (the combination of the stopped symbols of the reels 103L, 103C and 103R).is a prize receiving form which allows an item to be mounted (step 504). If the hit prize receiving form is a prize receiving form which allows no item to be mounted, the microcomputer 120 ends the current game.

On the other hand, if the hit prize receiving form is a prize receiving form which allows an item to be mounted on the character, the microcomputer 120 determines whether an item has been mounted on a portion of a character which has been displayed on the liquid crystal display 105 and on which an additional item is now to be mounted (step 505). If an item has already been mounted on that portion, the microcomputer 120 causes the liquid crystal display 105 to display a message to inquire whether the already mounted item should be replaced with the displayed item, and determines the contents of the operation of the player in accordance therewith (step 506). Furthermore, the display message to inquire whether the already mounted item should be replaced with the displayed item, includes, e.g., operation guidance inviting operation of a certain switch when it is "YES" and an invitation to operate another switch when it is "NO".

When no item is already mounted on the portion of the character, on which an item is now to be additionally mounted, or when the replacement of the item on that portion of the character is instructed, the microcomputer 120 causes the liquid crystal display 105 to display that an item related to the current hit is mounted on the displayed character image (step 508), and updates character information in the character buffer memory (see reference 23 in FIG. 3) in the RAM 123 (step 509) to end the current game.

When an item has been mounted on a portion of a character, to prevent the player from replacing the item the microcomputer 120 immediately ends the current game.

Figure 13B:
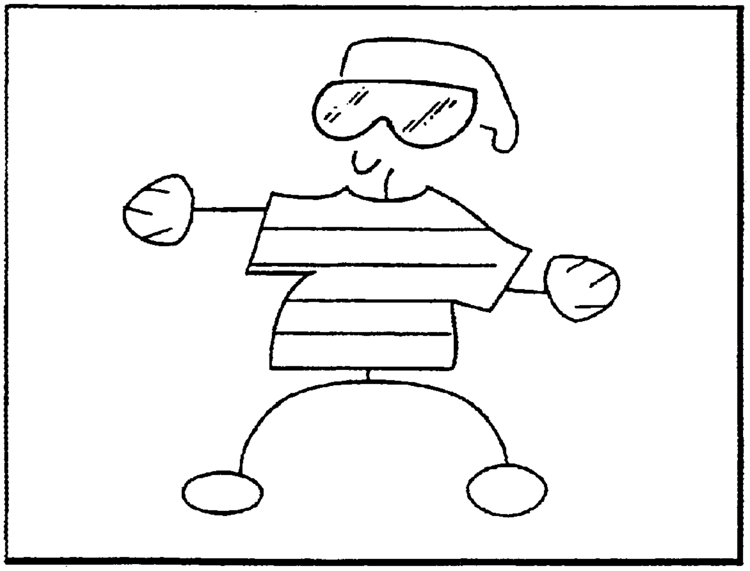
Figure 14A:
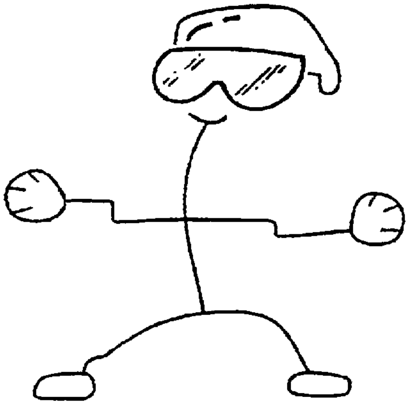
FIGS. 14(A) through 14(F) are illustrations showing the moving images of a display character in the slot machine of FIG. 10.
Figure 14B:
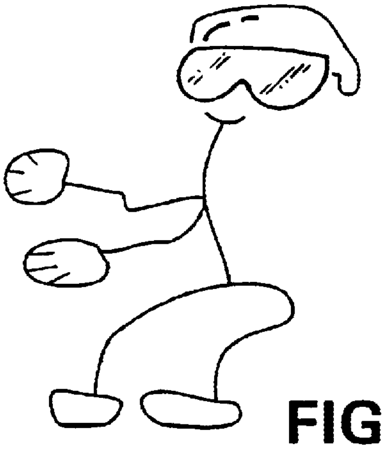
Figure 14C:
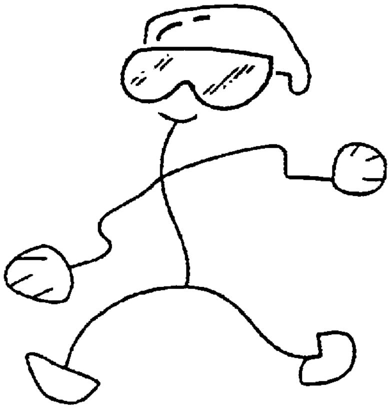
Figure 14D:
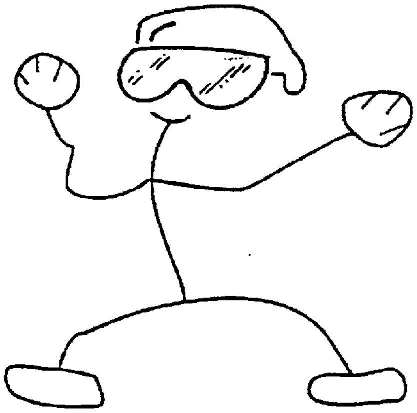
Figure 14E:
Figure 14F:

FIG. 13(B) shows a display screen on which an item is mounted by a hit in a prize receiving form which allows the item to be mounted, in a game carried out in the state shown in FIG. 13(A). When the processing at step 507 is completed, no item intended to be added is displayed as shown in FIG. 13(B). Thereafter, at step 500, the display screen returns to the state shown in FIG. 13(A).

In the slot machine shown in this example, as shown 25 at steps 500 and 501 in FIG. 12, the item for mounting displayed on the liquid crystal display 105 is suitably updated so as to rouse the players interest. The determination which item the display item is updated to is carried out by the routine shown in FIG. 15, which is different from the above described routine of FIG. 12.

Figure 15:
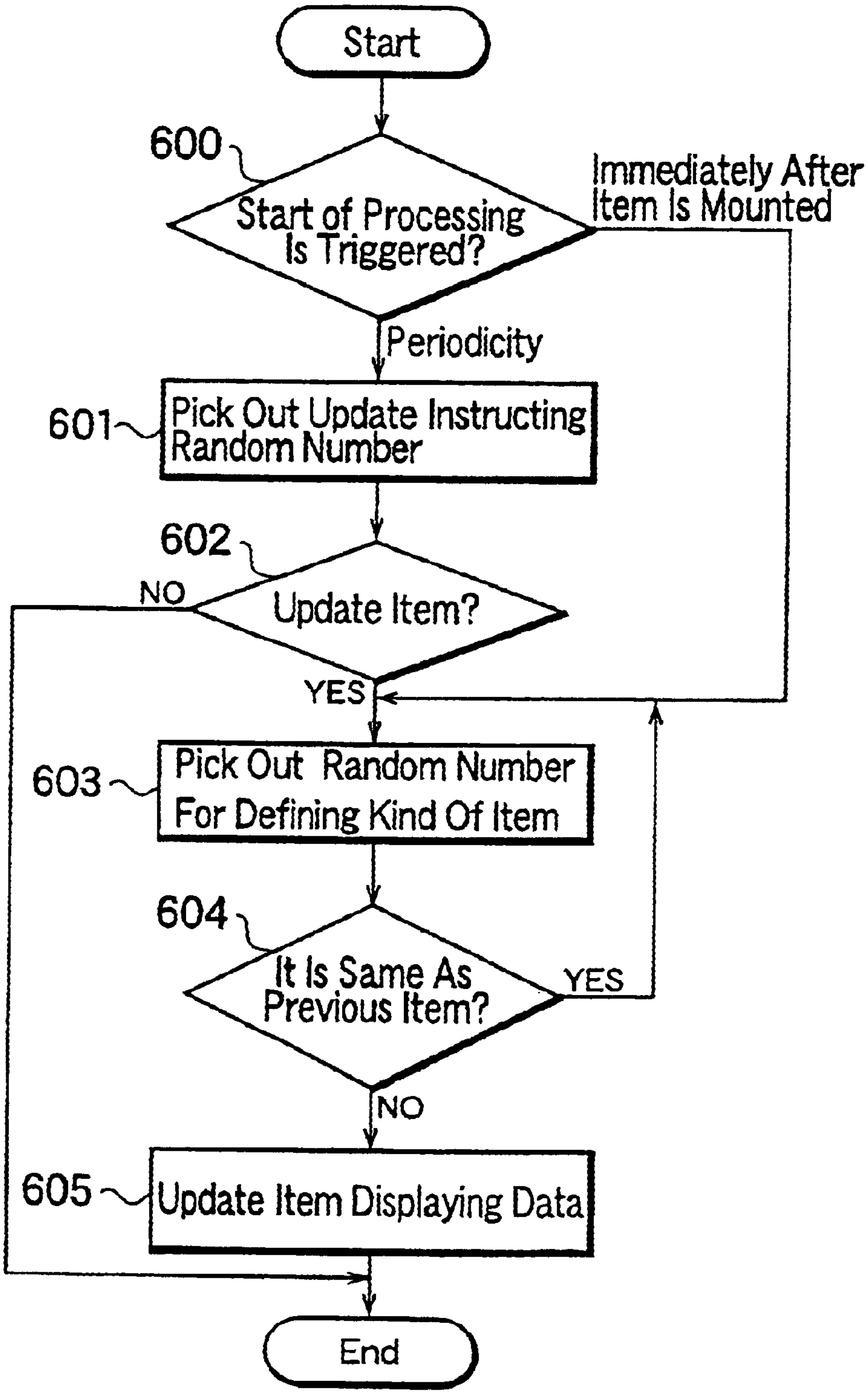
FIG. 15 is a flow chart of a routine for determining items to be mounted on a character in the slot machine of FIG. 10.

The microcomputer 120 starts the routine shown in FIG. 15, when a predetermined period of time had elapsed after the last step shown in FIG. 15 is completed, or when the game routine of FIG. 12 has been completed with the result being a prize receiving form which allows the item to be mounted (step 504 of FIG. 12).

First, the microcomputer 120 determines whether the signal to start the routine of FIG. 15 results from lapse of a predetermined period of time after the completion of the last execution of the routine shown in FIG. 15 or that the game routine of FIG. 12 about the game has been completed with the result determined to be in the prize receiving form allowing the item to be mounted (step 504 of FIG. 12)(this includes a case where no item is mounted) (step S600).

When the routine of FIG. 14 is started upon lapse of the predetermined period of time, the microcomputer 120 obtains a random number value, which instructs or refuses to update the item, from the random number sampling circuit 127 (step 601), and determines whether the obtained value is a value instructing update of the item (step 602). If the obtained random number value is a value not allowing update of an item, the microcomputer 120 immediately ends the execution of the routine shown in FIG. 15.

On the other hand, when the signal to start the routine of FIG. 15 results from completion of the game routine of FIG. 12 in the prize receiving form allowing the item to be mounted (step 504 of FIG. 12), or that the random number instructing or refusing to update the item is a value instructing update of the item, the microcomputer 120 obtains a random number value defining the kind of item from the random number sampling circuit 127 (step 603), and determines whether the random number value instructs the same kind of item as the previous kind (step 604). If the random number value instructs the same kind of item as the previous kind, the microcomputer 120 causes the routine to return to step 603 to again select a random number value instructing the kind of item.

The item displaying data thus stored are used for carrying out the above described determination at step 500 of FIG. 12 to suitably change the displayed item.

Furthermore, while the prize receiving form for allowing the item to be mounted has been described as different for every kind of item, the prize receiving form for allowing the item to be mounted may be fixed regardless of the kind of item. In addition, after the kind of the displayed item (including the updated display) is determined, the prize receiving form serving as item mounting conditions may be determined by selecting a random number.

The game operation as the slot machine and the operation for raising the character related to the game operation have been described above.

The slot machine of this example can also operate as the character participating terminal game machine 3 of FIG. 1 and as the audience terminal game machine 4. However, the operation of the slot machine as the character participating terminal game machine 3, and as the audience terminal machine 4 can be understood from the above description of the operation referring to FIGS. 8 and 9, although the names of members and so forth are different. Therefore, the description thereof is omitted.

In addition, the operation for printing the character is the same as that of other systems having the print function, except that the printed content is a character image, so that the detailed description of the operation is omitted.

Similarly, the reading of character information from the IC card 144, and the recording of character information on the IC card are the same as those of other systems using an IC card as an external recording medium, except that the operating part uses the existing switches and so forth of the slot machine (of course, dedicated keys and/or switches for the operation may be provided), so that the detailed description thereof is omitted.

(A-4) Effects in First Preferred Embodiment

According to the first preferred embodiment, each of the terminal game machines 3 and 4 can not only execute its original game, it can also operate as a terminal unit of the game system. Therefore, the player can participate in another game in front of the game machine, so that it is possible to extend the period of time that the player is positioned in front of the game machine.

In addition, even if the player who plays the original game with the terminal game machine 3 or 4 gets tired of the original game, the player can restore his/her interest by participating in the game which is carried out by the competition type game machine 2, as an indirect player or an audience member, so that it is possible to provide a game machine capable of reducing or eliminating a player's weariness. Thus, it is possible to expect an increase in play of a game by a player who is wedded to the issue of the game.

Moreover, since the character participating terminal game machine 3 raises a character by the prize receiving form of the original game for the game machine, the player is also interested in the raising of the character, so that it is possible to expect an increase in play of the original game.

In addition, the character participating terminal game machine 3 has the function of reading/recording character information from/in a character recording medium, so that the raised character information can be stored in the character recording medium. That is, when the player leaves the game machine, the recorded character information can be carried with the player, so that it is possible to prevent the raising of the character from coming to nothing.

In addition, since the character recording medium is common to a plurality of kinds of character participating terminal game machines 3, the player can continue to raise a character even if the player moves to another game machine, thus further preventing the player from losing interest.

Moreover, the prize receiving probability in the play of the competition type game, in which the character has participated, varies according to the character raising state. Therefore, also from this point of view, the player will be interested in the raising of the character, so that it is possible to expect an increase in play of a game in the character participating terminal game machine.

In addition, even,in the case of the same character, the prizing receiving probability varies in accordance with the kind of the competition type game which is carried out by the competition type game machine. Therefore, the player can select a competition type game in which the character participates, in view of the item with which the character is equipped, so that the player will be further interested in the raising of the character. This is basis for a further expectation of an increase in play of a game in a character participating terminal game machine. Naturally, this also increases the expectation of play of a game in a competition type game machine.

In addition, for example, even if the player leaves the place of amusement, the player can verify the degree of the raising of the character by the player, if necessary, since the character image can be printed in the character participating terminal game machine.

(B) Second Preferred Embodiment

Referring to the accompanying drawings, the second preferred embodiment of a game machine, a recording medium for the game machine, and a game system according to the present invention will be described below.

Figure 16:
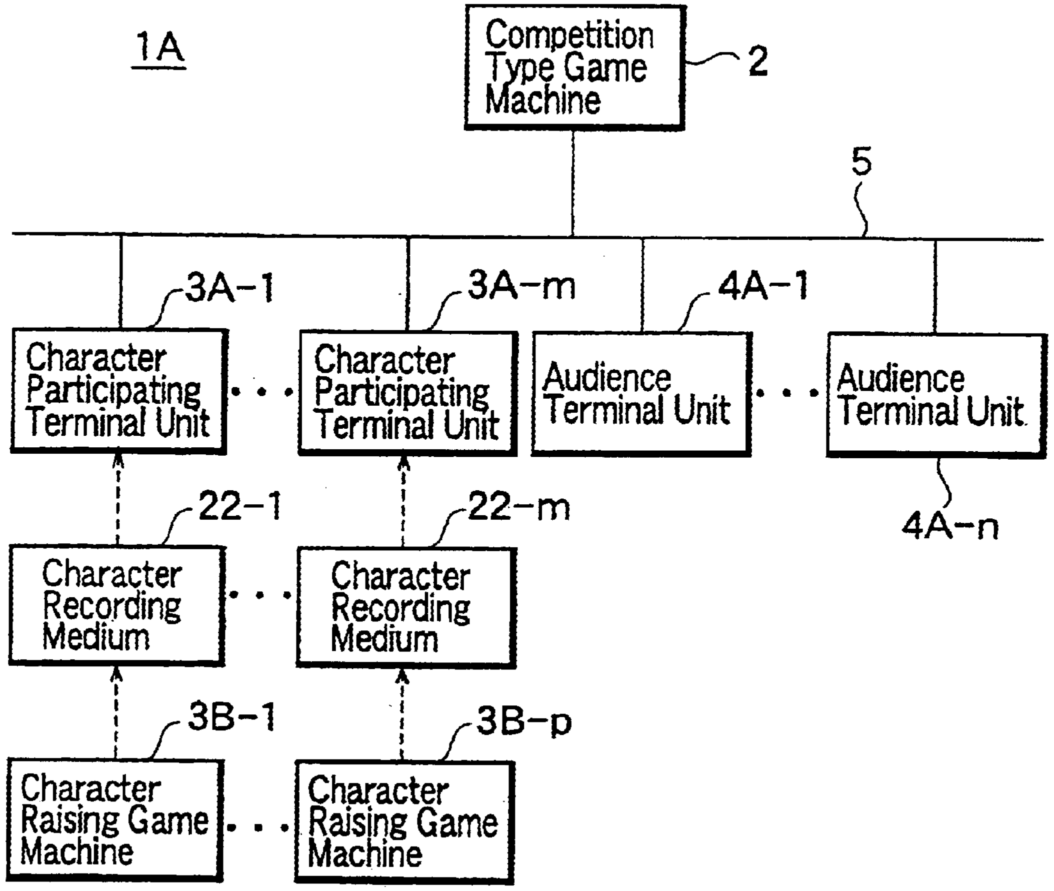
FIG. 16 is a block diagram showing the whole construction of the second preferred embodiment of a game system according to the present invention.

FIG. 16 is a block diagram showing the second preferred embodiment of a game system 1A according to the present invention. In this figure, the same or corresponding reference numbers are given to components the same or corresponding to those in the above described preferred embodiment.

As shown in FIG. 16, the game system 1A comprises a competition type game machine 2 and a plurality of terminal units 3A-1 through 3A-m and 4A-1 through 4A-n which are connected to the competition type game machine 2 via a wire or radio network 5. Alternatively, the plurality of terminal units 3A-1 through 3A-m and 4A-1 through 4A-n may be connected directly to the competition type game machine 2 in the form of a star.

The competition type game machine 2 is the same as that in the first preferred embodiment, and serves as a main body for executing a competition type game.

Each of the terminal units 3A-1 through 3A-m and 4A-1 through 4A-n functions as a terminal unit of the game system which is a network system. The terminal units 3A-1 through 3A-m and 4A-1 through 4A-n are divided into two kinds of terminal units.

The first kind of terminal units (which will be hereinafter referred to as character participating terminal units) 3A-1 through 3A-m are designed to allow a character to participate in a competition type game, which is carried out by the competition type game machine 2, on the basis of payment of a participation fee for a chance to win a prize in accordance with the results of competition. The second kind of terminal units (which will be hereinafter referred to as audience terminal units) 4A-1 through 4A-n are designed to allow a person, who bets on his/her expected result of competition, to participate in a competition type game, which is carried out by the competition type game machine 2, as an audience member, and to obtain a dividend when the result of competition is coincident with the expected result.

The character participating terminal units 3A-1 through 3A-m correspond to the character participating terminal game machines 3-1 through 3-m in the first preferred embodiment. However, unlike the character participating terminal game machines 3-1 through 3-m, the character participating terminal units 3A-1 through 3A-m do not function as game machines and do not have the function of raising a character. The internal construction of each of the character participating terminal units 3A-1 through 3A-m is the same as that of the character participating terminal game machine 3 shown in FIG. 3, except for the character raising part 25 and the printing part 31, although the detailed internal construction thereof is not shown.

The processing in each of the character participating terminal units 3A-1 through 3A-m is substantially the same as the routine shown in the flow chart of FIG. 8 of the first preferred embodiment.

Information about characters which are placed in competition, by character participating terminal units 3A-1 through 3A-m, in a competition type game executed by the competition type game machine, is input from loaded character recording media 22-1 through 22-m. The character recording media 22-1 through 22-m themselves are the same as in the first preferred embodiment. The recording of the character information in the character recording media 22-1 thorough 22-m is carried out by means of character raising game machines 3B-1 through 3B-p.

The character raising game machines 3B-1 through 3B-p also correspond to the character participating terminal game machines 3-1 through 3-m in the first preferred embodiment. However, unlike the character participating terminal game machines 3-1 through 3-m, the character raising game machines 3B-1 through 3B-p do not function as terminal units of the game system 1A. That is, each of the character raising game machines 3B-1 through 3B-p functions as a game machine, and further functions to raise a character in accordance with the prize receiving form of the game. The internal construction of each of the character raising game machines 3B-1 through 3B-m is the same as that of the character participating terminal game machine 3 shown in FIG. 3, except for the participation fee receiving part 28, the prize paying part 29 and the communication part 30, although the detailed internal construction thereof is not shown.

The programs for character raising in the character raising game machines 3B-1 through 3B-p are substantially the same as those shown in the flow charts of FIGS. 12 and 15 for the first preferred embodiment.

Furthermore, the character raising game machines 3B-1 through 3B-p may carry out different kinds of games when functioning as unit game machines.

The audience terminal units 4A-1 through 4A-n correspond to the audience terminal game machines 4-1 through 4-n in the first preferred embodiment. However, unlike the audience terminal game machines 4-1 through 4-n, each of the audience terminal units 4A-1 through 4A-n does not function as a game machine. The internal construction of each of the audience terminal units 4A-1 through 4A-n is the same as that of the audience terminal game machine 4 shown in FIG. 4 (since the construction of a game machine is omitted from FIG. 4), although the detailed internal construction thereof is omitted.

The program in each of the audience terminal units 4A-1 through 4A-n is the same as that shown in the flow chart of FIG. 9 of the first preferred embodiment.

The whole operation of the game system in the second preferred embodiment can be understood from the description of the first preferred embodiment, so that the description is not repeated here.

According to the second preferred embodiment, since the character raising game machine 3B raises a character in accordance with the prize receiving form in the original game of the game machine, the player is also interested in the raising of the character, so that it is possible to expect an increase in play of a game.

In addition, the character participating terminal game machine 3B has the function of reading/recording character information from/in a character recording medium, so that the raised character information can be stored in the character recording medium. That is, when the player leaves the game machine, the character information can be recorded in the character recording medium can be carried with the player, so that it is possible to prevent the raising of the character from coming to nothing.

In addition, since the character recording medium is common to a plurality of kinds of character raising game machines 3B and character participating terminal units 3A, the player can continue to raise a character even if the player moves to another game machine. Accordingly, even if the game machine is changed, it is possible to prevent the player from losing interest, and it is possible to cause the raised character to participate in the competition type game in the competition type game machine 2.

Moreover, the prize receiving probability in the competition type game, in which the character has participated, varies according to the character raising state. Therefore, the player will be interested in the raising of the character, so that an increase can be expected in play of the character raising terminal game machine.

In addition, even in the case of the same character, the prizing receiving probability varies in accordance with the kind of the competition type game which is carried out by the competition type game machine. Therefore, the player can select a competition type game, in which the character participates, in view of the item with which the character is equipped, so that the player is interested in the raising of the character for this reason also. Therefore, an increase in play of a game in the character raising terminal game machine and play of a game in a competition type game machine.

In addition, if the player leaves the place of amusement, the player can verify the degree of the raising of the character by his/her play, if necessary, since the character image can be printed in the character raising terminal game machine.

(C) Other Preferred Embodiments

While various modifications have been described for each of the above described preferred embodiments, the present invention can be embodied in other various ways as follows.

While only character information has been recorded in the character recording medium in each of the above described preferred embodiments, other information, such as money information, may be recorded therein.

While each of the character participating terminal game machines 3 and the character raising game machines 3B does not have the function of issuing character recording media as described for each of the preferred embodiments, it may also have that function.

While the raising of the character has been described as the mounting of additional items in each of the above described preferred embodiments, alternatively it may be the growth of a character, such as an animal, from a baby. In this case, the items may be foods, and the degree of the raising of the character may be expressed as a total of values for the kinds of foods which have been eaten by the character.

While the items for growing the character have been described as automatically determined by the character participating terminal game machine and the character raising game machine in each of the preferred embodiments, alternatively the player may select those items.

While a single competition type game machine is provided in the network of each of the above described preferred embodiments, a plurality of competition type game machines may be provided in the network.

As described above, there is no limit to the kind of the game of the terminal game machine. In the above described preferred embodiments, a slot machine has been described as an example of a terminal game machine. In the case of the above described slot machine, while the display of the slot machine game is different from that of the display the characters and items, alternatively, the contents of the game, characters and items may be displayed on the same display screen in some game machines. Furthermore, a game screen and a screen for displaying characters and so forth may be displayed as a multi-window.

Figure 17:
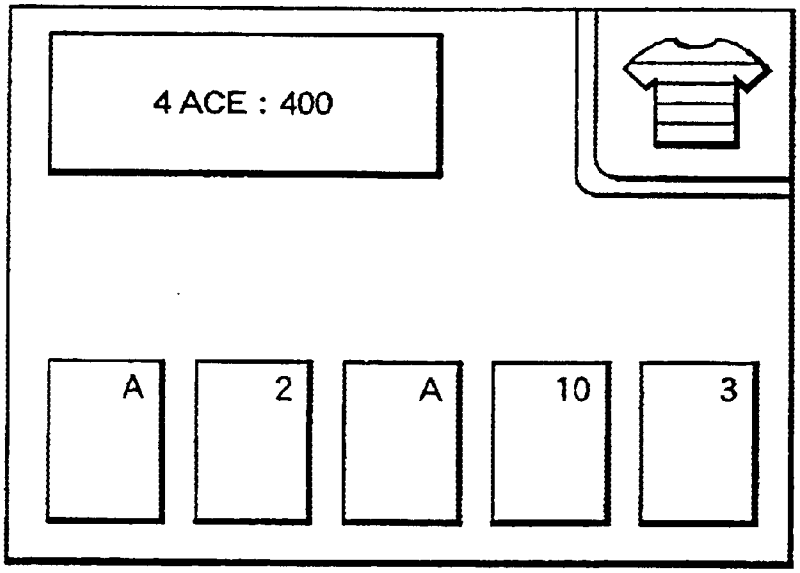
FIG. 17 is an illustration showing an example of a display of items in a poker game machine.

FIG. 17 shows an example of a display screen of a poker game machine, on which the contents of a game and items are displayed.

While rankings have been determined in a character participating competition type game in each of the above described preferred embodiments, characters may participate in a game other than the competition type game. For example, a character automatically determined by a game machine and a participating character determined by a player may fight, e.g., wrestling or sumo wrestling.

While the printer is described as printing the character image in each of the above described preferred embodiments, it may also print other information. For example, the results of the game, in which the character participates, and the amount of the prize may be printed. The printed medium may be in the form of a card or label.

As described above, in the game machine, the recording medium for the game machine and the game system according to the present invention, it is expected that a player increases an opportunity to play a game with a game machine, and it is possible to reduce player's weariness with respect to the game machine and to cause the player to restore his/her interest.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. An audience terminal game machine comprising:

a game memory containing a program for playing a non-competition game, in a first operational mode;

character raising means for making changes to a character in a manner indicating an increased probability of the character winning as a participant in at least one competition game, when the result of the non-competition game is a predetermined hit;

communication means for communicating information, including the changed character, to a remote game machine for play by the remote machine of the at least one competition game in accordance with a program contained in the remote machine;

operation means for selecting either said first operational mode for playing said noncompetition game or a second operational mode for betting on the at least one competition game played in the remote machine;

expected game results information input means for inputting expected information about the expected result of the at least one competition game which is played by said remote game machine;

bet receiving means for receiving a bet on the expected result;

information transmitting means for transmitting information about the bet via said communication means; and dividend paying means for receiving said information about the result of the at least one competition game, which has been transmitted by the remote game machine via said communication means, to pay a dividend when said information about the result of the at least one competition game indicates coincidence with expectation.

2. An audience terminal game machine according to claim 1 wherein:

said operation means activates said second operational mode, responsive to an invitation signal from the remote game machine, provided play of said non-competition game in said first operational mode is not in progress.

3. An audience terminal game machine according to claim 1 wherein:

said dividend paying means returns the bet responsive to a refusal signal from the remote game machine indicating a refusal to accept the bet.

4. An audience terminal game machine according to claim 1 wherein:

said operation means switches from said second operational mode to said first operational mode, responsive to said refusal signal.

5. An audience terminal game machine according to claim 1 wherein said operation means has a third operational mode wherein a player's operational input is accepted for participation in the competition game by interaction with the remote game machine.

6. A game system comprising:

a central game machine for playing at least one competition game and for receiving bets on an expected result of said at least one competition game, said central game machine comprising a memory containing a program for play of said at least one competition game; and at least one audience terminal game machine comprising:

a game memory containing a program for playing a non-competition game, in a first operational mode;

character raising means for making changes to a character in a manner indicating an increased probability of the character winning as a participant in the at least one competition game, when the result of the non-competition game is a predetermined hit;

communication means for communicating information, including the changed character, to the central game machine for play by the central game machine of the at least one competition game, in which the changed character is a participant, in accordance with a program contained in the central game machine;

operation means for selecting either said first operational mode for playing said non-competition game or a second operational mode for betting on the at least one competition game played in the central game machine;

expected game results information input means for inputting expected information about the expected result of the at least one competition game which is played by the central game machine;

bet receiving means for receiving a bet on the expected result;

information transmitting means and transmitting information about the bet via said communication means; and dividend paying means for receiving said information about the result of the at least one competition game, which has been transmitted by the central game machine via said communication means, to pay a dividend when said information about the result of the at least one competition game indicates coincidence with expectation.

7. A game system according to claim 6 further comprising at least a second said audience terminal game machine, said one and second audience terminal game machines respectively containing different game programs to play different non-competition games in said first operational mode.

8. A game system according to claim 6 wherein:

said operation means activates said second operational mode, responsive to an invitation signal from the central game machine, provided play of said non-competition game in said first operational mode is not in progress.

9. A game system according to claim 6 wherein:

said dividend paying means returns the bet responsive to a refusal signal from the central game machine indicating a refusal to accept the bet.

10. A game system according to claim 6 wherein:

said operation means switches from said second operational mode to said first operational mode, responsive to said refusal signal.

11. A game system according to claim 6 wherein said operation means has a third operational mode wherein a player's operational input is accepted for participation in the competition game by interaction with the central game machine.

* * * * *